(12) United States Patent
Lord et al.

(10) Patent No.: US 9,767,423 B2
(45) Date of Patent: *Sep. 19, 2017

(54) SYSTEM AND METHODS FOR DIRECTING ONE OR MORE TRANSPORTATION VEHICLE UNITS TO TRANSPORT ONE OR MORE END USERS

(71) Applicant: Elwha LLC, Bellevue, WA (US)

(72) Inventors: Richard T. Lord, Gig Harbor, WA (US); Robert W. Lord, Seattle, WA (US); Nathan P. Myhrvold, Medina, WA (US); Clarence T. Tegreene, Mercer Island, WA (US)

(73) Assignee: Elwha LLC, Bellevue, WA (US)

( * ) Notice: Subject to any disclaimer, the term of this patent is extended or adjusted under 35 U.S.C. 154(b) by 23 days.

This patent is subject to a terminal disclaimer.

(21) Appl. No.: 14/511,706

(22) Filed: Oct. 10, 2014

(65) Prior Publication Data

US 2015/0323334 A1 Nov. 12, 2015

Related U.S. Application Data

(63) Continuation of application No. 14/510,383, filed on Oct. 9, 2014, and a continuation-in-part of application (Continued)

(51) Int. Cl.
*G06F 19/00* (2011.01)
*G06Q 10/06* (2012.01)
(Continued)

(52) U.S. Cl.
CPC .......... *G06Q 10/06* (2013.01); *G01C 21/3438* (2013.01); *G06Q 10/06311* (2013.01); *G06Q 10/083* (2013.01); *G06Q 50/30* (2013.01)

(58) Field of Classification Search
CPC .. B61L 27/0027; B61L 3/006; B61L 15/0027; B61L 15/0036; B61C 17/12
(Continued)

(56) References Cited

U.S. PATENT DOCUMENTS 5,802,492 A 9/1998 DeLorme et al.
5,920,697 A 7/1999 Masters et al.
(Continued)

OTHER PUBLICATIONS

Dillenburg et al.; "The Intelligent Travel Assistant"; The IEEE 5th International conference on Intelligent Transportation Systems; Sep. 3-6, 2002; pp. 691-696; IEEE.
(Continued)

*Primary Examiner* — McDieunel Marc

(57) ABSTRACT

Computationally implemented methods and systems that are designed for transmitting one or more requests for one or more identities of one or more transportation vehicle units for transporting one or more end users; receiving the one or more identities of the one or more transportation vehicle units for transporting the one or more end users, the one or more identified transportation vehicle units having been identified based, at least in part, on a determination that the one or more identified transportation vehicle units do not have any package delivery obligation that would be violated if the one or more identified transportation vehicle units transport the one or more end users to one or more destination locations; and directing the one or more identified transportation vehicle units to rendezvous with the one or more end users in order to transport the one or more end users to the one or more destination locations. In addition to the foregoing, other aspects are described in the claims, drawings, and text.

51 Claims, 22 Drawing Sheets

Related U.S. Application Data

No. 14/318,182, filed on Jun. 27, 2014, and a continuation-in-part of application No. 14/329,451, filed on Jul. 11, 2014, which is a continuation of application No. 14/328,002, filed on Jul. 10, 2014, said application No. 14/510,383 is a continuation-in-part of application No. 14/456,627, filed on Aug. 11, 2014, which is a continuation of application No. 14/455,534, filed on Aug. 8, 2014, which is a continuation-in-part of application No. 14/476,042, filed on Sep. 3, 2014, which is a continuation of application No. 14/474,587, filed on Sep. 2, 2014.

(60) Provisional application No. 61/989,394, filed on May 6, 2014.

(51) Int. Cl.
   *G01C 21/34* (2006.01)
   *G06Q 50/30* (2012.01)
   *G06Q 10/08* (2012.01)

(58) Field of Classification Search
   USPC ..... 701/19, 20, 21, 410, 533, 537, 200, 209; 340/573.4, 990; 455/456.5, 552.1
   See application file for complete search history.

(56) References Cited

U.S. PATENT DOCUMENTS

| | | |
|---|---|---|
| 6,321,158 B1 | 11/2001 | DeLorme et al. |
| 7,312,712 B1 | 12/2007 | Worrall |
| 7,840,427 B2 | 11/2010 | O'Sullivan |
| 7,957,871 B1 | 6/2011 | Echeruo |
| 8,626,366 B2 | 1/2014 | Noffsinger et al. |
| 8,688,532 B2 | 4/2014 | Khunger et al. |
| 8,775,070 B1 | 7/2014 | Bhatia |
| 8,831,677 B2 | 9/2014 | Villa-Real |
| 2002/0186144 A1* | 12/2002 | Meunier ............... G07B 15/00 340/4.6 |
| 2003/0040944 A1 | 2/2003 | Hileman |
| 2009/0005963 A1 | 1/2009 | Jarvinen |
| 2009/0248587 A1 | 10/2009 | Van Buskirk |
| 2010/0280884 A1 | 11/2010 | Levine et al. |
| 2010/0332131 A1 | 12/2010 | Horvitz et al. |
| 2011/0059693 A1 | 3/2011 | O'Sullivan |
| 2011/0257883 A1 | 10/2011 | Kuznetsov |
| 2011/0288762 A1 | 11/2011 | Kuznetsov |
| 2012/0041675 A1 | 2/2012 | Juliver et al. |
| 2012/0112696 A1 | 5/2012 | Ikeda et al. |
| 2012/0253654 A1 | 10/2012 | Sun et al. |
| 2013/0054139 A1 | 2/2013 | Bodin et al. |
| 2013/0131909 A1* | 5/2013 | Cooper ............... B61L 27/0011 701/23 |
| 2013/0158861 A1 | 6/2013 | Lerenc |
| 2013/0158869 A1 | 6/2013 | Lerenc |
| 2013/0226365 A1 | 8/2013 | Brozovich |
| 2014/0094998 A1 | 4/2014 | Cooper et al. |
| 2014/0173511 A1 | 6/2014 | Lehmann et al. |
| 2015/0006005 A1* | 1/2015 | Yu ............... G05D 1/0297 701/22 |
| 2015/0006072 A1 | 1/2015 | Goldberg et al. |
| 2015/0019132 A1 | 1/2015 | Gusikhin et al. |
| 2015/0025932 A1* | 1/2015 | Ross ............... G06K 9/20 705/7.27 |
| 2015/0278759 A1* | 10/2015 | Harris ............... G06Q 10/08355 705/338 |
| 2015/0294431 A1* | 10/2015 | Fiorucci ............... G06Q 50/26 705/13 |
| 2015/0323333 A1 | 11/2015 | Lord et al. |
| 2015/0323336 A1 | 11/2015 | Lord et al. |
| 2015/0324717 A1 | 11/2015 | Lord et al. |
| 2015/0324729 A1 | 11/2015 | Lord et al. |
| 2015/0324735 A1 | 11/2015 | Lord et al. |
| 2015/0324944 A1 | 11/2015 | Lord et al. |
| 2015/0324945 A1 | 11/2015 | Lord et al. |
| 2015/0325128 A1 | 11/2015 | Lord et al. |

OTHER PUBLICATIONS

Guc et al.; "Real-time, Scalable Route Planning using a Stream-Processing Infrastructure"; 2010 13th International IEEE Annual Conference on Intelligent Transportation Systems; Sep. 19-22, 2010; pp. 986-991; IEEE.

Lalos et al.; "A Framework for dynamic car and taxi pools with the use of Positioning Systems"; 2009 Computation World: Future Computing, Service Computation, Cognitive, Adaptive, Content, Patterns; bearing a date of 2009; pp. 385-391; IEEE Computer Society.

Shahzada et al.; "Dynamic Vehicle Navigation: An A* Algorithm Based Approach Using Traffic and Road Information"; 2011 International Conference on Computer Applications and Industrial Electronics; bearing a date of 2011; pp. 514-518; IEEE.

Boufraied, Amine; "A Diagnostic Approach for Advanced Tracking of Commercial Vehcles With Time Window Constraints"; IEEE Transaction on Intelligent Transportation Systems; bearing a date of Sep. 2013; pp. 1470-1479; vol. 14, No. 3; IEEE.

Fougeres et al; "A Push Service for Carpooling"; bearing a date of 2012 (created on Dec. 8, 2015); IEEE; 2012 IEEE International Conference on Green Computing and Communications, Conference on Internet of Things, and Conference on Cyber, Physical and Social Computing; pp. 685-691; IEEE Computer Society.

Megalingam et al; "Automated Wireless Carpooling System for an Eco-Friendly Travel"; bearing a date of 2011 (created on Dec. 8, 2015); IEEE; pp. 325-329.

Vaughn-Nichols, Steven J.; "Will Mobile Computing's Future be Location, Location, Location?"; IEEE; bearing a date of Feb. 2009; pp. 14-17; IEEE Computer Society.

Amey et al.; "'Real-Time' Ridesharing—The Opportunites and Challenges of Utilizing Mobile Phone Technology to Improve Rideshare Services"; Paper submitted to the 2011 Transportation Research Board Annual Meeting; bearing a date of Aug. 1, 2010; pp. 1-17.

* cited by examiner

| 202* Request Transmitting Module |
|---|
| 302 End User Request Receiving Module |
| 304 End User Preference Data Transmitting Module |
| 306 End User Information Transmitting Module |

FIG. 3A

| 204* Transportation Vehicle Unit Identity Acquiring Module |
|---|
| 308 Package Delivery Information Acquiring Module |

FIG. 3B

| 206* Transportation Vehicle Unit Directing Module |
|---|
| 310 Directive Transmitting Module |
| 312 End User Image Transmitting Module |
| 314 Discount Fee Rate Transmitting Module |

FIG. 3C

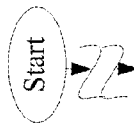

504 Receiving the one or more identities of the one or more transportation vehicle units for transporting the one or more end users, the one or more identified transportation vehicle units having been identified based, at least in part, on a determination that the one or more identified transportation vehicle units do not have any package delivery obligation that would be violated if the one or more identified transportation vehicle units transport the one or more end users to one or more destination locations 737 Receiving the one or more identities of the one or more transportation vehicle units, the one or more identified transportation vehicle units having been identified based, at least in part, on a determination that the one or more identified transportation vehicle units have one or more package delivery obligations for delivering one or more packages that will not violate one or more requirements for transporting the one or more end users 741 Receiving the one or more identities of the one or more transportation vehicle units, the one or more identified transportation vehicle units having been identified based, at least in part, on a determination that the one or more identified transportation vehicle units have one or more packages for delivery to one or more delivery locations that are along or proximate to a direct route to one or more destination locations of the one or more end users from one or more rendezvous locations where the one or more end users rendezvous with the one or more identified transportation vehicle units in order to be transported to the one or more destination location 742 Receiving the one or more identities of the one or more identified transportation vehicle units, the one or more identified transportation vehicle units having been identified based, at least in part, on a determination that the one or more identified transportation vehicle units have one or more packages for delivery to one or more delivery locations that are along or proximate to a direct route that is the shortest distance route to the one or more destination locations from the one or more rendezvous locations 743 Receiving the one or more identities of the one or more identified transportation vehicle units, the one or more identified transportation vehicle units having been identified based, at least in part, on a determination that the one or more identified transportation vehicle units have one or more packages for delivery to one or more delivery locations that are along or proximate to a direct route that is the most time efficient route to the one or more destination locations from the one or more rendezvous locations 744 Receiving the one or more identities of the one or more transportation vehicle units, the one or more identified transportation vehicle units having been identified based, at least in part, on a determination that the one or more identified transportation vehicle units have one or more packages for delivery to one or more delivery locations that when delivered by the one or more identified transportation vehicle units during transport of the one or more end users do not add more than a predefined amount of time to the total amount of time it would have taken to transport the one or more end users to the one or more destination locations using the direct route and when no packages are being delivered during the transport of the one or more end users to the one or more destination locations

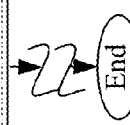

FIG. 7F

SYSTEM AND METHODS FOR DIRECTING ONE OR MORE TRANSPORTATION VEHICLE UNITS TO TRANSPORT ONE OR MORE END USERS

CROSS-REFERENCE TO RELATED APPLICATIONS

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a continuation of U.S. patent application Ser. No. 14/510,383, entitled SYSTEM AND METHODS FOR DIRECTING ONE OR MORE TRANSPORTATION VEHICLE UNITS TO TRANSPORT ONE OR MORE END USERS, naming Richard T. Lord, Robert W. Lord, Nathan P. Myhrvold, and Clarence T. Tegreene as inventors, filed 9 Oct. 2014, which is currently co-pending or is an application of which a currently co-pending application is entitled to the benefit of the filing date.

The present application constitutes a continuation-in-part of U.S. patent application Ser. No. 14/318,182, entitled METHODS, SYSTEMS, AND DEVICES FOR PROVIDING TRANSPORTATION SERVICES, naming Richard T. Lord, Robert W. Lord, Nathan P. Myhrvold, and Clarence T. Tegreene, as inventors, filed 27 Jun. 2014.

The present application constitutes a continuation-in-part of U.S. patent application Ser. No. 14/329,451, entitled SYSTEMS AND METHODS FOR TRAVEL PLANNING THAT CALLS FOR AT LEAST ONE TRANSPORTATION VEHICLE UNIT, naming Richard T. Lord, Robert W. Lord, Nathan P. Myhrvold, and Clarence T. Tegreene, as inventors, filed 11 Jul. 2014, which is currently co-pending or is an application of which a currently co-pending application is entitled to the benefit of the filing date, and which is a continuation of U.S. patent application Ser. No. 14/328,002, entitled SYSTEMS AND METHODS FOR TRAVEL PLANNING THAT CALLS FOR AT LEAST ONE TRANSPORTATION VEHICLE UNIT, naming Richard T. Lord, Robert W. Lord, Nathan P. Myhrvold, and Clarence T. Tegreene, as inventors, filed 10 Jul. 2014.

The present application constitutes a continuation-in-part of U.S. patent application Ser. No. 14/456,627, entitled SYSTEM AND METHODS FOR PROVIDING AT LEAST A PORTION OF A TRAVEL PLAN THAT CALLS FOR AT LEAST ONE TRANSPORTATION VEHICLE UNIT, naming Richard T. Lord, Robert W. Lord, Nathan P. Myhrvold, and Clarence T. Tegreene, as inventors, filed 11 Aug. 2014, which is currently co-pending or is an application of which a currently co-pending application is entitled to the benefit of the filing date, and which is a continuation of U.S. patent application Ser. No. 14/455,534, entitled SYSTEM AND METHODS FOR PROVIDING AT LEAST A PORTION OF A TRAVEL PLAN THAT CALLS FOR AT LEAST ONE TRANSPORTATION VEHICLE UNIT, naming Richard T. Lord, Robert W. Lord, Nathan P. Myhrvold, and Clarence T. Tegreene, as inventors, filed 8 Aug. 2014.

The present application constitutes a continuation-in-part of U.S. patent application Ser. No. 14/476,042, entitled SYSTEM AND METHODS FOR IDENTIFYING ONE OR MORE TRANSPORTATION VEHICLE UNITS WITH OR WITHOUT PACKAGE DELIVERY OBLIGATION FOR TRANSPORTING ONE OR MORE END USERS, naming Richard T. Lord, Robert W. Lord, Nathan P. Myhrvold, and Clarence T. Tegreene, as inventors, filed 3 Sep. 2014, which is currently co-pending or is an application of which a currently co-pending application is entitled to the benefit of the filing date, and which is a continuation of U.S. patent application Ser. No. 14/474,587, entitled SYSTEM AND METHODS FOR IDENTIFYING ONE OR MORE TRANSPORTATION VEHICLE UNITS WITH OR WITHOUT PACKAGE DELIVERY OBLIGATION FOR TRANSPORTING ONE OR MORE END USERS, naming Richard T. Lord, Robert W. Lord, Nathan P. Myhrvold, and Clarence T. Tegreene, as inventors, filed 2 Sep. 2014.

RELATED APPLICATIONS

None as of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

In one or more various aspects, a method includes, but is not limited to, transmitting one or more requests for one or more identities of one or more transportation vehicle units for transporting one or more end users, receiving the one or more identities of the one or more transportation vehicle units for transporting the one or more end users, the one or more identified transportation vehicle units having been identified based, at least in part, on a determination that the one or more identified transportation vehicle units do not have any package delivery obligation that would be violated if the one or more identified transportation vehicle units transport the one or more end users to one or more destination locations; and directing the one or more identified transportation vehicle units to rendezvous with the one or more end users in order to transport the one or more end users to the one or more destination locations. In various implementations, at least one of the above operations is performed by a machine or article of manufacture. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

In one or more various aspects, a system includes, but is not limited to, means for transmitting one or more requests for one or more identities of one or more transportation vehicle units for transporting one or more end users, means for receiving the one or more identities of the one or more transportation vehicle units for transporting the one or more end users, the one or more identified transportation vehicle units having been identified based, at least in part, on a determination that the one or more identified transportation vehicle units do not have any package delivery obligation that would be violated if the one or more identified transportation vehicle units transport the one or more end users to one or more destination locations; and means for directing the one or more identified transportation vehicle units to rendezvous with the one or more end users in order to transport the one or more end users to the one or more destination locations. In addition to the foregoing, other system aspects are described in the claims, drawings, and text forming a part of the disclosure set forth herein.

In one or more various aspects, a system includes, but is not limited to, circuitry for transmitting one or more requests for one or more identities of one or more transportation vehicle units for transporting one or more end users, circuitry for receiving the one or more identities of the one or more transportation vehicle units for transporting the one or more end users, the one or more identified transportation vehicle units having been identified based, at least in part, on a determination that the one or more identified transportation vehicle units do not have any package delivery obligation that would be violated if the one or more identified transportation vehicle units transport the one or more end users to one or more destination locations; and circuitry for directing the one or more identified transportation vehicle units to rendezvous with the one or more end users in order to transport the one or more end users to the one or more destination locations. In addition to the foregoing, other system aspects are described in the claims, drawings, and text forming a part of the disclosure set forth herein.

In one or more various aspects, a computer program product, comprising a signal bearing non-transitory storage medium, bearing one or more instructions including, but not limited to, transmitting one or more requests for one or more identities of one or more transportation vehicle units for transporting one or more end users, receiving the one or more identities of the one or more transportation vehicle units for transporting the one or more end users, the one or more identified transportation vehicle units having been identified based, at least in part, on a determination that the one or more identified transportation vehicle units do not have any package delivery obligation that would be violated if the one or more identified transportation vehicle units transport the one or more end users to one or more destination locations, and directing the one or more identified transportation vehicle units to rendezvous with the one or more end users in order to transport the one or more end users to the one or more destination locations. In addition to the foregoing, other computer program product aspects are described in the claims, drawings, and text forming a part of the disclosure set forth herein.

In one or more various aspects, a system includes, but is not limited to a transportation vehicle unit identity acquiring module configured to acquire one or more identities of one or more transportation vehicle units for transporting one or more end users, the one or more identified transportation vehicle units having been identified based, at least in part, on a determination that the one or more identified transportation vehicle units do not have any package delivery obligation that would be violated if the one or more identified transportation vehicle units transport the one or more end users to one or more destination locations; and a transportation vehicle unit directing module configured to direct the one or more identified transportation vehicle units to rendezvous with the one or more end users in order to transport the one or more end users to the one or more destination locations.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 3A shows another perspective of the request transmitting module 202* of FIGS. 2A and 2B (e.g., the request transmitting module 202' of FIG. 2A or the request transmitting module 202" of FIG. 2B) in accordance with various embodiments.

FIG. 3B shows another perspective of the transportation vehicle unit identity acquiring module 204* of FIGS. 2A and 2B (e.g., the transportation vehicle unit identity acquiring module 204' of FIG. 2A or the transportation vehicle unit identity acquiring module 204" of FIG. 2B) in accordance with various embodiments.

FIG. 3C shows another perspective of the transportation vehicle unit directing module 206* of FIGS. 2A and 2B (e.g., the transportation vehicle unit directing module 206' of FIG. 2A or the transportation vehicle unit directing module 206" of FIG. 2B) in accordance with various embodiments.

FIG. 7F is a high-level logic flowchart of a process depicting alternate implementations of the transportation vehicle unit identity receiving operation 504 of FIG. 5.

DETAILED DESCRIPTION

Figure 1:
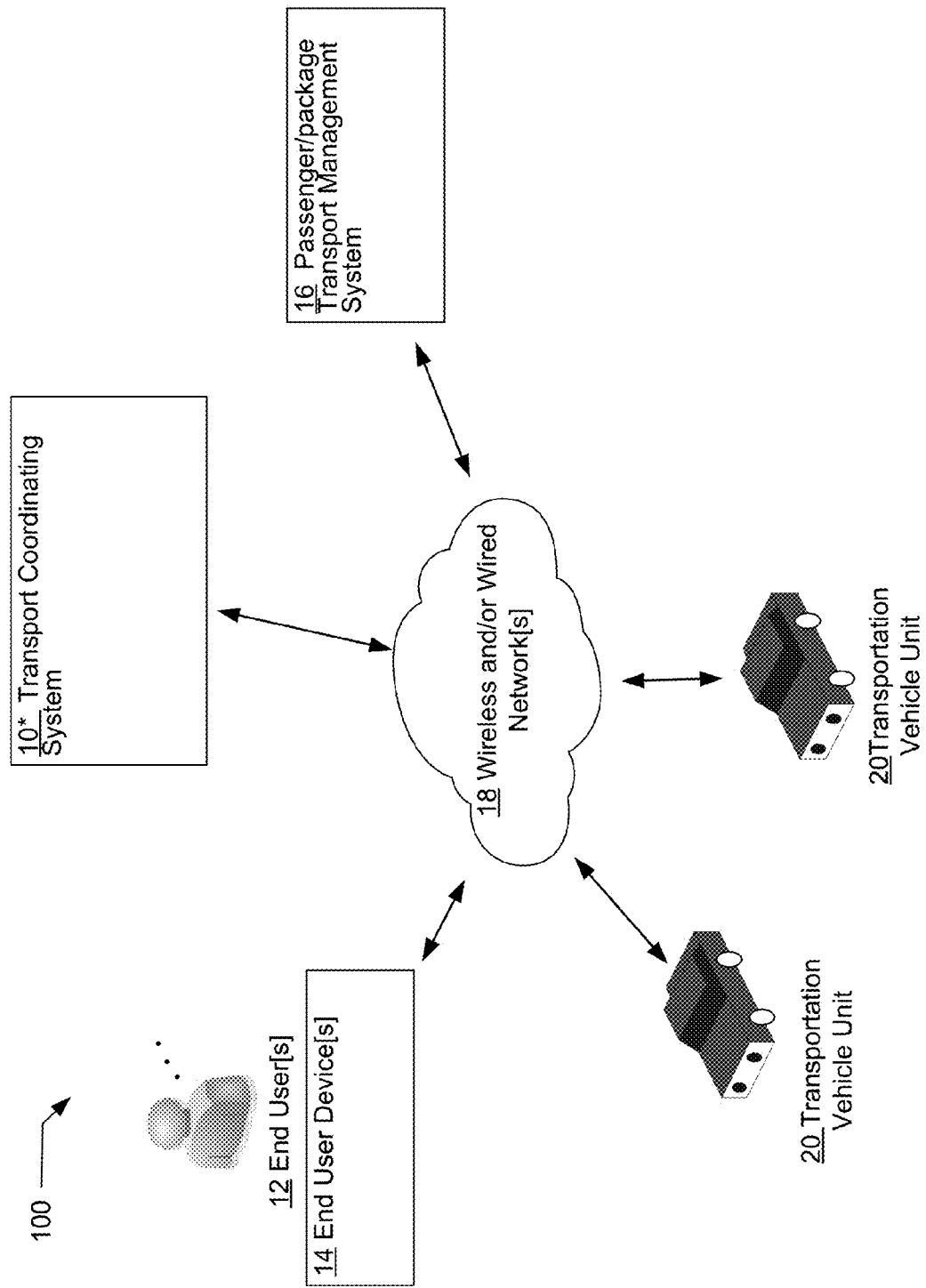
FIG. 1 illustrates a transport coordinating system 10* operating in an exemplary environment

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

Thus, in accordance with various embodiments, computationally implemented methods, systems, circuitry, articles of manufacture, ordered chains of matter, and computer program products are designed to, among other things, provide one or more wearable computing devices for the environment illustrated in FIG. 1.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic, etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., WIKIPEDIA, High-level programming language, (as of Jun. 5, 2012, 21:00 GMT). In order to facilitate human comprehension, in many instances, high-level programming languages resemble or even share symbols with natural languages. See, e.g., WIKIPEDIA, (as of Jun. 5, 2012, 21:00 GMT).

It has been argued that because high-level programming languages use strong abstraction (e.g., that they may resemble or share symbols with natural languages), they are therefore a "purely mental construct" (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional external linking devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)— the best known of which is the microprocessor. A modern microprocessor will often contain more than one hundred million logic gates in its many logic circuits (and often more than a billion transistors). See, e.g., WIKIPEDIA, Logic gates; (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., WIKIPEDIA, Computer architecture, (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine.

Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., WIKIPEDIA, Instructions per second, (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mutt," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media holds or transmits device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/ converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electro-magnetically actuated devices, and/or virtually any combination thereof. Consequently, as used herein, "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include, but are not limited to, a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, application programs, one or more interaction devices (e.g., a touch pad, a touch screen, an antenna, etc.), and/or control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and application programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, application programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as INTEL Corporation's and/or CROSSBOW Corporation's mote components and supporting hardware, software, and/or firmware.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server. The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspacc RACKSPACE). PaaS may include, e.g., one or more software and/or development tools hosted on an infrastructure (e.g., a computing platform and/or a solution stack from which the client can create software interfaces and applications, e.g., MICROSOFT AZURE). SaaS may include, e.g., software hosted by a service provider and accessible over a network (e.g., the software for the application and/or the data associated with that software application may be kept on the network, e.g., GOOGLE APPS, SALES FORCE). DaaS may include, e.g., providing desktop, applications, data, and/or services for the user over a network (e.g., providing a multi-application framework, the applications in the framework, the data associated with the applications, and/or services related to the applications and/or the data over the network, e.g., CITRIX). The foregoing is intended to be exemplary of the types of systems and/or methods referred to in this application as "cloud" or "cloud computing" and should not be considered complete or exhaustive.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Specific examples of operably couplable include, but are not limited, to physically mateable and/or physically interacting components, and/or wirelessly interactable, and/or wirelessly interacting components, and/or logically interacting, and/or logically interactable components.

To the extent that formal outline headings are present in this application, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings and/or descriptions of single topics may span two or more topic headings). Hence, any use of formal outline headings in this application is for presentation purposes, and is not intended to be in any way limiting.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Although one or more users may be shown and/or described herein as a single illustrated figure, those skilled in the art will appreciate that one or more users may be representative of one or more human users, robotic users (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

One of the newest trends in the field of transportation/commuting particularly in urban settings is the development of transportation networking services provided by web-based companies such as UBER and LYFT that allow users to retain drivers/vehicles for transportation serves through, for example, mobile applications. The increasingly popularity of such "ridesharing" services have made some of the early entrants in this new field household names. As with many new technological ventures, the functionalities provided through such services are somewhat limited. However there appears to be ample opportunities for adding new and value adding functionalities to such services (as well as to more traditional transportation services such as Taxi services) in order to provide more robust transportation networking systems.

Paralleling the rapidly increasing demand for ridesharing services is the explosive demand for door-to-door package delivery services that are partly as a result of increasingly popularity of online retail services such as AMAZON, EBAY, and so forth. The demand for door-to-door package delivery services, however, can fluctuate wildly during the course of a typical year. For example, although demand for such services may be generally steady throughout the year, demand for such services will often explode during certain times of the year such as during the holiday season (e.g., Thanksgiving to New Year), Mother's day, and so forth. Although a few of the online retailers, such as AMAZON, are currently attempting to provide their own door-to-door package delivery services, most of door-to-door package delivery services are provided by a small group of relatively large parcel delivery companies (e.g., UPS, FEDEX, DSL, USPS, and so forth). Unfortunately, these parcel delivery companies have limited resources (e.g., delivery vehicles) and are sometimes unable to meet demand for door-to-door package delivery services particularly during peak seasons (e.g., holiday season).

In accordance with various embodiments, systems and methods that will allow for-hire passenger vehicles (herein "transportation vehicle units"), such as those provided by ridesharing or taxi services, to seamlessly transport passengers as well as to deliver packages—sometimes transporting passengers and delivering packages concurrently. In some cases, these systems and methods may be able to coordinate the matching of a transportation vehicle unit with one or more end users (e.g., passengers or customers) even when, for example, the transportation vehicle unit already has obligations to deliver packages. More particularly, the systems and methods may be designed to, among other things, coordinate matching of transportation vehicle unit (e.g., a transportation vehicle such a gas or electric powered passenger vehicle, a human or robotic driver, and a transport computing device such as a Smartphone or a dedicated computing device for receiving directives to transport passengers and/or to deliver packages) with one or more end users (e.g., customers/passengers) in order to transport the one or more end users to one or more destinations, the transportation vehicle unit having been identified as not having any package delivery obligations that would be violated if the transportation vehicle unit transports the one or more end users to their destination[s]. In some cases, the matching of the one or more end users to a transportation vehicle that has been determined not to have any package delivery obligations that would be violated if the transportation vehicle unit transports the one or more end users may be based on identification information (e.g., information identifying a transportation vehicle unit for transporting the one or more end users) provided by a network system (see, for example, the passenger/package transport management system 16 of FIG. 1) as will be further described herein.

In some cases, in order for a transportation vehicle unit, such as those provided by ridesharing or taxi services, to deliver packages (e.g., parcels), it is envisioned that at least in some cases such a transportation vehicle unit (which may include a transport vehicle such as a gas or electric powered vehicle, a human or robotic driver, and a transport computing device such as a mobile computing device or specialized dedicated computing device for receiving directives/assignments and for transmitting status) will typically secure package or packages (e.g., parcels) to be delivered at the start of the day or sometime during the course of a typical day, and to deliver those package or packages over the course of the day. As a result, such a transportation vehicle unit may or may not have package delivery obligations over the course of the day depending upon whether, for example, the transportation vehicle unit is currently carrying packages for delivery or whether the transportation vehicle unit is assigned/obligated to pick-up and deliver a package in the future—e.g., later in the day.

In some embodiments, in order to select or find a transportation vehicle unit for transporting one or more end users to one or more destination locations a determination may be made as to whether a transportation vehicle unit, which is currently not carrying any passengers or is about to be free of any passenger load, has any obligation to deliver package or packages and if the transportation vehicle unit does, in fact, have such a delivery obligation (e.g., deliver a package to its destination location by a certain time) to determine that the delivery obligation is not violated if the transportation vehicle unit does indeed transport the one or more end users. In some cases when a transportation vehicle unit assigned to transport one or more end users is determined to have one or more obligations for delivering one or more packages, a determination may be made as to which of the one or more packages may be delivered during the transport of the one or more end users. Such a determination may be based, for example, on the proximity of the delivery locations of the one or more packages relative to the route (e.g., a direct route that is the shortest distance or most time efficient route) that the transportation vehicle unit may use in order to transport the one or more end users to the destination location and/or based on end user preferences (e.g., only one package delivery allowed during transportation or no delivery that adds more than 10 minutes to total travel time will be allowed) of at least one of the one or more end users.

Figure 4:
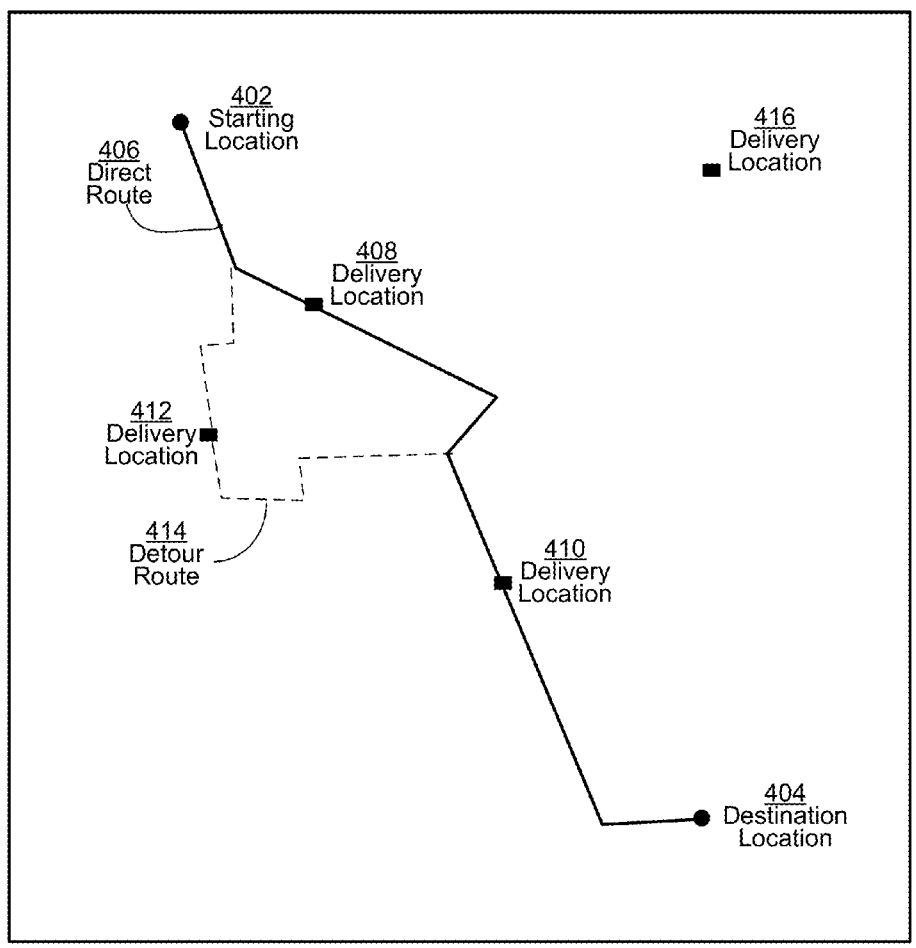
FIG. 4 illustrates exemplary alternative routes to a destination location and delivery locations for packages.

For example, referring now to FIG. 4, which illustrates an exemplary direct route 406 from a starting location 402 (e.g., a rendezvous location where one or more end users may rendezvous with a transportation vehicle unit for transport) to a destination location 404 that an exemplary transportation vehicle unit (e.g., a gas or electric powered automobile with a human or robotic driver) may use in order to transport one or more end users to the destination location 404. FIG. 4 further illustrates example delivery locations 408, 410, 412, and 416 of packages (e.g., parcels) that the exemplary transportation vehicle unit may be assigned or obligated to deliver. Note that there are typically many different ways (e.g., routes) for traveling from a starting location 402 to a destination location 404 in a typical urban or semi-urban setting. In some cases a "direct" route 406 may be the shortest distance route that the exemplary transportation vehicle unit may use in order to travel from the starting location to the destination location. In alternative cases, however, the direct route 406 may be the most time efficient route (e.g., fastest or quickest route) that the exemplary transportation vehicle unit may use in order to travel from the starting location to the destination location.

As illustrated, the delivery locations 408, 410, 412, and 416 of the packages that are obligated to be delivered by the exemplary transportation vehicle unit are located in several different locations relative to the direct route 406. Delivery locations 408 and 410, as illustrated, are actually located directly on or proximate to the direct route 406, while delivery location 412 is located in the relative proximity of the direct route 406 and could be reached by the exemplary transportation vehicle unit during the transport of the one or more end users if the exemplary transportation vehicle unit takes a short detour route 414 from the direct route 406. Delivery location 416 in contrast to the delivery locations 408, 410, and 412 is relatively far away from the direct route 406. Thus, any package scheduled to be delivered to the delivery location 416 may, in some cases, not be allowed to be delivered during the transport of the one or more end users to the destination location 404. Note that if the exemplary transportation vehicle unit is obligated to deliver a package to the delivery location 416 by a particular predefined time deadline (e.g., a deadline that will occur during transport of the one or more end users) then that may preclude the exemplary transportation vehicle unit from transporting the one or more end users to the destination location. In such circumstances, another transportation vehicle unit may be assigned to transport the one or more end users that does not have package delivery obligations that would interfere with the transport of the one or more end users.

With respect to the packages that are to be delivered to the delivery locations 408, 410, and 412, the exemplary transportation vehicle unit may or may not deliver such packages during the transport of the one or more end users depending on, for example, preferences (herein "end user preference") of the one or more end users (or of a third party such as the ridesharing or taxi company associated with the transportation vehicle unit). For example, if there is an end user preference that no packages are to be delivered during the transport of the one or more end users then no packages will be delivered during transport of the one or more end users. On the other hand, if there is an end user preference that allows package deliver only for delivery locations along the direct route then only packages to be delivered along the direct route (e.g., packages going to delivery locations 408 and 410) will be allowed to be delivered during transport of the one or more end users. If the end user preference further only allows one package delivery during transport of the one or more end users than only packages going to only one of the two delivery locations (e.g., delivery locations 408 and 410) will actually be allowed.

In some cases, if the end user preferences of the one or more end users allows for "limited" deliveries of packages (e.g., package deliveries that does not require substantial detour from the direct route 406 or that does not add significant amount of travel time to the destination location 404) during the transport of the one or more end users, then packages may be delivered to, for example, the delivery location 412 during transport of the one or more end users. It is recognized that in most instances, passengers (e.g., end users) may not want to have their transportation vehicle to make package delivery during their transport to their destination location. Thus, in order to provide an incentive, in some cases, passenger transportation fees charged to the end users may be discounted when packages are delivered during the transport of the end users. The passenger fee discount that may be given may be on a sliding scale basis where a greater discount may be given when more package delivery stops are made during the transport of the end users or when more travel time is added to overall travel time of the end users (e.g., the greater the delay in transporting the end users to the destination, the greater the discount). In various embodiments, the determination as to which transportation vehicle unit, which may or may not have package delivery obligations, will be selected for transporting one or more end users or the determination as to which packages, if any, may be delivered by the selected transportation vehicle unit during transport of one or more end users to a destination location may be made by, for example, a network system (e.g., one or more servers) as will be further described herein.

Turning now to FIG. 1, which illustrates a transport coordinating system 10\* operating in an exemplary environment 100. In various embodiments, the various operations and functionalities to be described herein may be implemented by the transport coordinating system 10\*. The transport coordinating system 10\* may be designed to coordinate the matching of one or more end users 12 (e.g., customers/passengers) with one or more transportation vehicle units 20 by arranging the one or more transportation vehicle units 20 to rendezvous with the one or more end users 12 in order to transport the one or more end users 12 to their destination location[s]. In various embodiments, the coordination of the one or more transportation vehicle units 20 to rendezvous with the one or more end users 12 may be based on identification information (that identifies the one or more transportation vehicle units 20 for transporting the one or more end users 12) provided by a passenger/package transport management system 16. For these embodiments, the a passenger/package transport management system 16 may have selected the one or more transportation vehicle units 20 for transporting the one or more end users 12 based, at least in part, on a determination that the one or more transportation vehicle units 20 does not to have any package delivery obligations that would be violated if the one or more "identified" transportation vehicle units 20 transports the one or more end users 12 to their destination location[s].

The transport coordinating system 10\* may be a network device such as a server or a workstation, or a plurality of network devices such as servers, workstations, and so forth. Note that for purposes of the following description "\*" represents a wildcard. Thus, references in the following description to, for example, "transport coordinating system 10\*" may be in reference to the transport coordinating system 10' of FIG. 2A, as well as to the transport coordinating system 10" of FIG. 2B, which are two different implementations of the transport coordinating system 10\* of FIG. 1.

The passenger/package transport management system 16, which may be designed to, among other things, keep track of the package delivery obligations of transportation vehicle units 20 as well as to determine whether a particular transportation vehicle unit 20 should be assigned for transporting one or more end users based, at least in part, on the package delivery obligations of the particular transportation vehicle unit 20, may also be a network device such as a server or a workstation, or a plurality of network devices such as servers, workstations, storage, and so forth (e.g., the "cloud").

As further illustrated in FIG. 1, the transport coordinating system 10\* may communicate with one or more end users 12 (via an end user device[s] 14), a passenger/package transport management system 16, and/or one or more transportation vehicle units 20 via one or more wireless and/or wired networks 18. The one or more wireless and/or wired networks 18 may comprise of, for example, one or more of a local area network (LAN), metropolitan area network (MAN), a wireless local area network (WLAN), a personal area network (PAN), a Worldwide Interoperability for Microwave Access (WiMAX), public switched telephone network (PTSN), a general packet radio service (GPRS) network, a cellular network, a Client/Server network, a virtual private network (VPN), and so forth.

In various embodiments, an end user device 14 may be associated or affiliated with one or more end users 12. An end user device 14 may be a mobile device (e.g., a Smartphone or tablet computer) or a personal computer (e.g., a laptop computer, a desktop computer, a workstation, and so forth). Although not depicted in FIG. 1, in various embodiments, the transport coordinating system 10* may communicate with a transportation vehicle unit 20 (which may comprise of, among other things, a transportation vehicle and a robotic or human driver) via a transport computing device (e.g., a dedicated computing device or a general purpose mobile device such as a Smartphone or tablet computer executing specialized programming instructions) associated with the transportation vehicle unit 20 (or associated with a driver of the transportation vehicle unit 20).

In various embodiments, upon receiving a request from an end user device 14 for transport services to transport one or more end users 12, the transport coordinating system 10* may transmit to the passenger/package transport management system 16, one or more requests for one or more identities of one or more transportation vehicle units 20 for transporting the one or more end users 12. The passenger/package transport management system 16 upon receiving the request from the transport coordinate system 10* may identify one or more transportation vehicle units 20 for transporting the one or more end users 12 to their destination locations based, at least in part, on the current package delivery obligations (including no current package delivery obligations) of the one or more "identified" transportation vehicle units 20. In some cases, the identified transportation vehicle units 20 may be selected for transporting the one or more end users 12 based also on the end user preferences (e.g., no more than one package delivery may be allowed during transport of the one or more end users 12) of at least one of the one or more end users 12.

The passenger/package transport management system 16 may then transmit back to the transport coordinating system 10* information that identifies the one or more identified transportation vehicle units 20. Based, at least in part, the information provided by the passenger/package transport management system 16, the transport coordinating system 10* may direct the one or more identified transportation vehicle units 20 (e.g., transmit one or more directives or instructions to the one or more transport computing devices associated with the one or more identified transportation vehicle units 20) to rendezvous with the one or more end users 12 at one or more rendezvous locations (which in some cases, may be the current or present location or locations of the one or more end users 12) in order to transport the one or more end users 12 to their destinations (e.g., destination locations). The transport coordinating system 10* may also transmit to one or more end user devices 14 associated with the one or more end users 12 one or more notifications that identifies the one or more identified transportation vehicle units that will transport the one or more end users 12 to their destination location[s]. A more detailed description of the various operations to be performed by the transport coordinating system 10* will be provided herein with respect to the various processes to be described below.

Figure 2A:
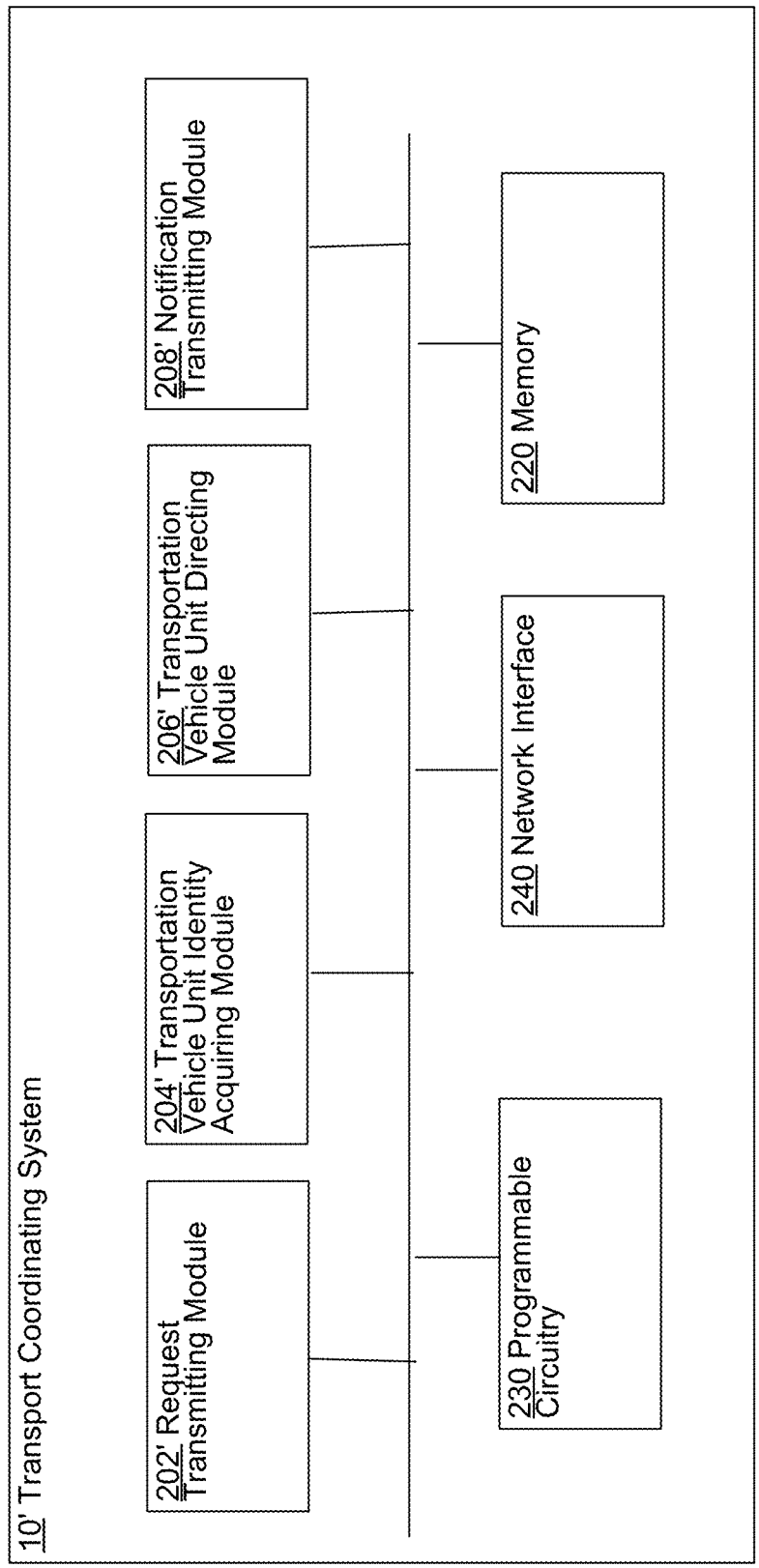
FIG. 2A shows a high-level block diagram of a particular implementation of the transport coordinating system 10* of FIG. 1 (illustrated as transport coordinating system 10').
Figure 2B:
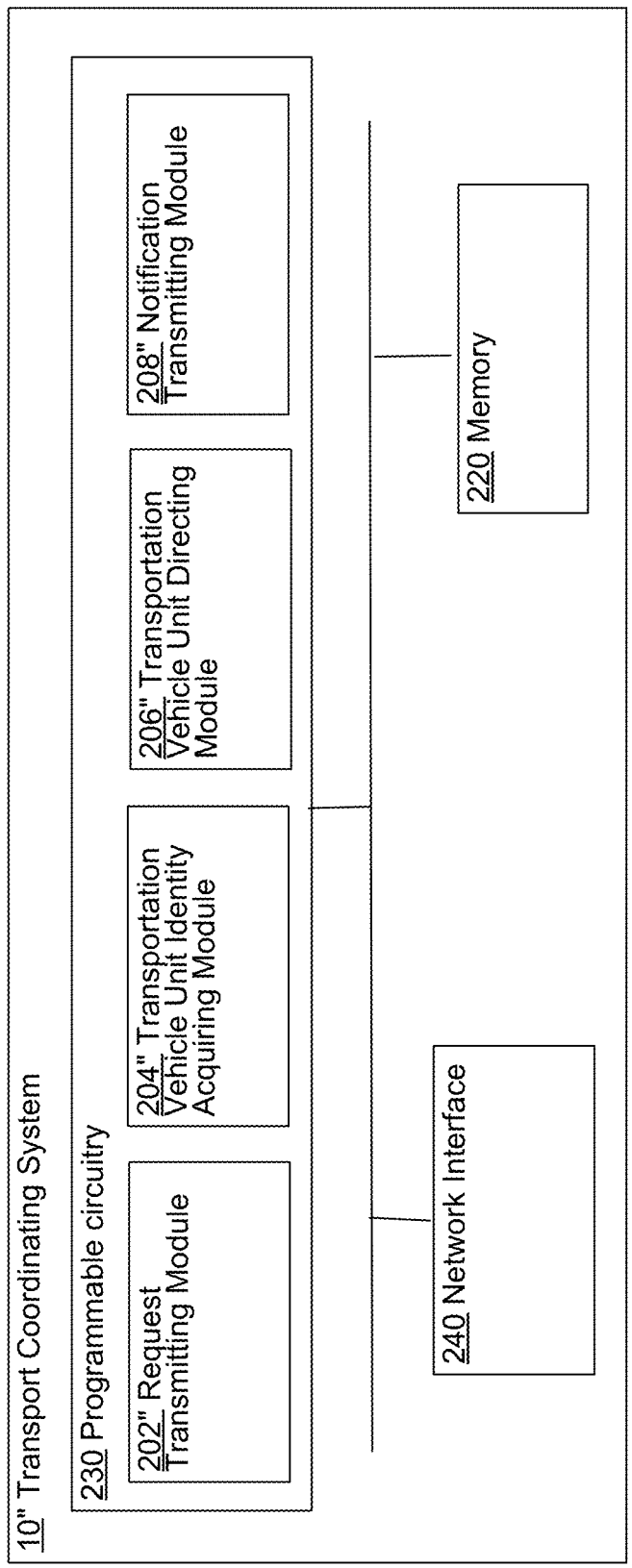
FIG. 2B shows another high-level block diagram of another implementation of the transport coordinating system 10* of FIG. 1 (illustrated as transport coordinating system 10").

Referring now to FIGS. 2A and 2B, which illustrate two block diagrams representing two different implementations of the transport coordinating system 10* of FIG. 1. In particular, and as will be further described herein, FIG. 2A illustrates a transport coordinating system 10' that is the "hardwired" or "hard" implementation of the transport coordinating system 10* of FIG. 1 that can implement the operations and processes to be described herein. The transport coordinating system 10' includes certain logic modules including a request transmitting module 202', a transportation vehicle unit identity acquiring module 204', a transportation vehicle unit directing module 206', and a notification transmitting module 208' that are implemented using purely hardware or circuitry components (e.g., application specific integrated circuit (or ASIC). In contrast, FIG. 2B illustrates a transport coordinating system 10" that is the "soft" implementation of the transport coordinating system 10* of FIG. 1 in which certain logic modules including a request transmitting module 202", a transportation vehicle unit identity acquiring module 204", a transportation vehicle unit directing module 206", and a notification transmitting module 208" are implemented using programmable circuitry 230 (e.g., one or more processors 230 including one or more microprocessors, controllers, CPUs, GPUs, etc.) executing one or more programming instructions (e.g., software).

The embodiments of the transport coordinating system 10* illustrated in FIGS. 2A and 2B (e.g., the transport coordinating system 10' of FIG. 2A and the transport coordinating system 10" of FIG. 2B) are two extreme implementations of the transport coordinating system 10* in which all of the logic modules (e.g., the request transmitting module 202', the transportation vehicle unit identity acquiring module 204', the transportation vehicle unit directing module 206', and the notification transmitting module 208') are implemented using purely hardware solutions (e.g., circuitry such as ASIC) as illustrated in FIG. 2A or in which all of the logic modules (e.g., the request transmitting module 202", the transportation vehicle unit identity acquiring module 204", the transportation vehicle unit directing module 206", and the notification transmitting module 208") are implemented using software solutions (e.g., programmable instructions being executed by programmable circuitry 230 such as field programmable gate array (FPGA) or one or more processors) as illustrated in FIG. 2B. Since there are many ways of combining hardware, software, and/or firmware in order to implement the various logic modules (e.g., the request transmitting module 202*, the transportation vehicle unit identity acquiring module 204*, the transportation vehicle unit directing module 206*, and the notification transmitting module 208"), only the two extreme implementations (e.g., the purely hardware solution as illustrated in FIG. 2A and the software solution of FIG. 2B) are illustrated here. It should be noted here that with respect to the "soft" implementation illustrated in FIG. 2B, hardware in the form of programmable circuitry such as one or more processors 230 (or FPGA) are still needed in order to execute the software. Further details related to the two implementations of transport coordinating system 10* illustrated in FIGS. 2A and 2B will be provided in greater detail below.

In some instances, one or more components may be referred to herein as "configured to," "configured by," "configurable to," "operable/operative to," "adapted/adaptable," "able to," "conformable/conformed to," "designed to," etc. Those skilled in the art will recognize that such terms (e.g., "configured to") generally encompass active-state components and/or inactive-state components and/or standby-state components, unless context requires otherwise.

Referring particularly now to FIG. 2A, which illustrates that the transport coordinating system 10', in addition to the request transmitting module 202', the transportation vehicle unit identity acquiring module 204', the transportation vehicle unit directing module 206,' and the notification transmitting module 208', may further include programmable circuitry 230 (e.g., microprocessors, controllers, and so forth), a network interface 240 (network interface card or NIC), and/or memory 220. In various embodiments, memory 220 may comprise of volatile and/or non-volatile memory. In some embodiments, memory 220 may comprise of one or more of mass storage device, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In some embodiments, the memory 220 may be employed to store a variety of programming instructions (e.g., software) and data including data indicating current package delivery obligations of transportation vehicle units 20, end user preferences, current passenger and/or package delivery status of transportation vehicle units 20, and so forth.

Turning now to FIG. 2B, which illustrates a transport coordinating system 10" in which certain logic modules (the request transmitting module 202", the transportation vehicle unit identity acquiring module 204", the transportation vehicle unit directing module 206", and the notification transmitting module 208") are implemented using programmable circuitry 230. In addition, the transport coordinating system 10" may further include a memory 220 and a network interface 240 similar to the transport coordinating system 10' of FIG. 2A.

In various embodiments the request transmitting module 202\* of FIG. 2A or 2B (e.g., the request transmitting module 202' of FIG. 2A or the request transmitting module 202" of FIG. 2B) may be configured to, among other things, one or more requests for one or more identities of one or more transportation vehicle units 20 for transporting one or more end users 12. In contrast, the transportation vehicle unit identity acquiring module 204\* of FIG. 2A or 2B (e.g., the transportation vehicle unit identity acquiring module 204' of FIG. 2A or the transportation vehicle unit identity acquiring module 204" of FIG. 2B) may be configured to, among other things, receive or acquire the one or more identities of the one or more transportation vehicle units 20 for transporting the one or more end users 12, the one or more identified transportation vehicle units 20 having been identified based, at least in part, on a determination that the one or more identified transportation vehicle units 20 do not have any package delivery obligation that would be violated if the one or more identified transportation vehicle units 20 transport the one or more end users 12 to one or more destination locations. Meanwhile, the transportation vehicle unit directing module 206\* of FIG. 2A or 2B (e.g., the transportation vehicle unit directing module 206' of FIG. 2A or the transportation vehicle unit directing module 206" of FIG. 2B) may be configured to, among other things, direct the one or more identified transportation vehicle units 20 to rendezvous with the one or more end users 20 in order to transport the one or more end users 12 to the one or more destination locations. On the other hand, the notification transmitting module 208\* of FIG. 2A or 2B (e.g., the notification transmitting module 208' of FIG. 2A or the notification transmitting module 208" of FIG. 2B) may be configured to, among other things, transmit one or more notifications to one or more end user devices 14 associated with the one or more end users 12, the one or more notifications at least identifying the one or more identified transportation vehicle units 20 that will be transporting the one or more end users 12 to the one or more destination locations.

Referring now to FIG. 3A illustrating a particular implementation of the request transmitting module 202\* (e.g., the request transmitting module 202' or the request transmitting module 202") of FIG. 2A or 2B. As illustrated, the request transmitting module 202\* may include one or more sub-logic modules in various alternative implementations. For example, in various embodiments, the request transmitting module 202\* may further include an end user request receiving module 302, an end user preference data transmitting module 304, and/or an end user information transmitting module 306. Specific details related to the request transmitting module 202\* as well as the above-described sub-modules of the request transmitting module 202\* will be provided below with respect to the operations and processes to be described herein.

FIG. 3B illustrates a particular implementation of the transportation vehicle unit identity acquiring module 204\* (e.g., the transportation vehicle unit identity acquiring module 204' or the transportation vehicle unit identity acquiring module 204") of FIG. 2A or 2B. As illustrated, the transportation vehicle unit identity acquiring module 204\* may include one or more sub-logic modules in various alternative implementations. For example, in various embodiments, the transportation vehicle unit identity acquiring module 204\* may further include a package delivery information acquiring module 308. Specific details related to the transportation vehicle unit identity acquiring module 204" as well as the above-described sub-module of the transportation vehicle unit identity acquiring module 204\* will be provided below with respect to the operations and processes to be described herein.

FIG. 3C illustrates a particular implementation of the transportation vehicle unit directing module 206\* (e.g., the transportation vehicle unit directing module 206' or the transportation vehicle unit directing module 206") of FIG. 2A or 2B. As illustrated, the transportation vehicle unit directing module 206\* may include one or more sub-logic modules in various alternative implementations. For example, in various embodiments, the transportation vehicle unit directing module 206\* may further a directive transmitting module 310, an end user image transmitting module 312, and/or a discount fee rate transmitting module 314. Specific details related to the transportation vehicle unit directing module 206" as well as the above-described sub-modules of the transportation vehicle unit directing module 206\* will be provided below with respect to the operations and processes to be described herein.

Figure 5:
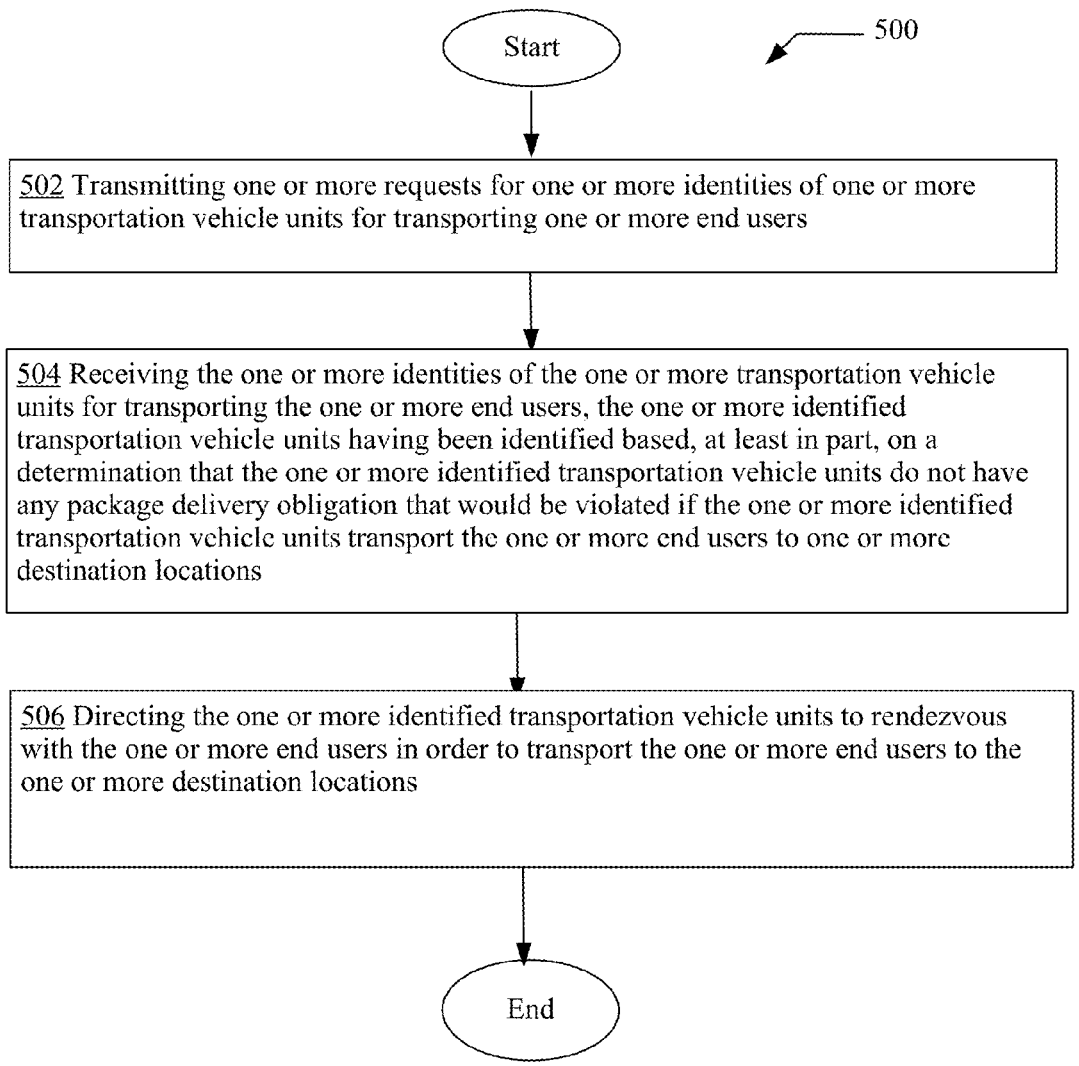
FIG. 5 is a high-level logic flowchart of a process, e.g., operational flow 500, according to some embodiments.

In the following, various operations associated with the above described transport coordinating system 10\* (e.g., the transport coordinating system 10' of FIG. 2A or the transport coordinating system 10" of FIG. 2B) will be presented in accordance with various alternative embodiments. FIG. 5, for example, illustrates an operational flow 500 representing example computationally-implemented operations that may be implemented for, among other things, receiving one or more identities of the one or more transportation vehicle units for transporting one or more end users, the one or more identified transportation vehicle units having been identified based, at least in part, on a determination that the one or more identified transportation vehicle units as not having any package delivery obligation that would be violated if the one or more identified transportation vehicle units transport the one or more end users to one or more destination locations; and directing the one or more identified transportation vehicle units to rendezvous with the one or more end users in order to transport the one or more end users to the one or more destination locations.

In FIG. 5 and in the following figures that include various examples of operational flows, discussions and explanations will be provided with respect to the transport coordinating system 10* described above and as illustrated in FIGS. 2A, 2B, 3A, 3B, and 3C, and/or with respect to other examples (e.g., as provided in FIGS. 1 and 4) and contexts. However, it should be understood that the operational flows may be executed in a number of other environments and contexts, and/or in modified versions of FIGS. 1, 2A, 2B, 3A, 3B, 3C, and/or 4. Also, although the various operational flows are presented in the sequence(s) illustrated, it should be understood that the various operations may be performed in orders other than those which are illustrated, or may be performed concurrently.

Further, in FIG. 5 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 5 as well as the other operations to be described herein are performed by at least one of a machine, an article of manufacture, or a composition of matter unless indicated otherwise.

For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

In any event, after a start operation, the operational flow 500 of FIG. 5 may move to a request transmitting operation 502 for transmitting one or more requests for one or more identities of one or more transportation vehicle units for transporting one or more end users. For instance, and as illustration, the request transmitting module 202* of the transport coordinating system 10* of FIG. 2A or 2B (e.g., the request transmitting module 202' of FIG. 2A or the request transmitting module 202" of FIG. 2B) transmitting one or more requests (e.g., one or more queries) for one or more identities (e.g., driver identifiers, vehicle identifiers, and so forth) of one or more transportation vehicle units 20 (e.g., electrical or gas powered automobile) for transporting one or more end users 12.

Operational flow 500 may also include a transportation vehicle unit identity receiving operation 504 for receiving the one or more identities of the one or more transportation vehicle units for transporting the one or more end users, the one or more identified transportation vehicle units having been identified based, at least in part, on a determination that the one or more identified transportation vehicle units do not have any package delivery obligation that would be violated if the one or more identified transportation vehicle units transport the one or more end users to one or more destination locations. For instance, the transportation vehicle unit identity acquiring module 204* (e.g., the transportation vehicle unit identity acquiring module 204' of FIG. 2A or the transportation vehicle unit identity acquiring module 204" of FIG. 2B) of the transport coordinating system 10* of FIG. 2A or 2B receiving or acquiring the one or more identities of the one or more transportation vehicle units 20 for transporting the one or more end users 12, the one or more identified transportation vehicle units 20 having been identified (e.g., identified by a passenger/package transport management system 16) based, at least in part, on a determination (e.g., a determination made by the passenger/package transport management system 16) that the one or more identified transportation vehicle units do not have any package delivery obligation that would be violated if the one or more identified transportation vehicle units 20 transport the one or more end users 12 to one or more destination locations.

In various embodiments, the one or more requested identities to be received may be in a variety of forms including, for example, one or more driver identifiers of one or more drivers for the one or more transportation vehicle units 20, one or more device identifiers of one or more transport computing devices (e.g., Smartphones, tablet computers, dedicated computing devices, etc.) associated with the one or more transportation vehicle units 20, one or more vehicle identifiers of one or more vehicles of the one or more transportation vehicle units 20, and so forth. In some cases, and as will be further described herein, the one or more identified transportation vehicle units 20 may not have any outstanding or current package delivery obligations. Alternatively, in other cases, the one or more identified transportation vehicle units 20 may have one or more package delivery obligations that would not be violated if the one or more identified transportation vehicle units 20 transport the one or more end users 12 to their destination location or locations. In such cases, the one or more identified transportation vehicle units 20 may, in some instances, have one or more package delivery obligations that require the delivery of one or more packages that may be satisfied by having the one or more identified transportation vehicle units 20 deliver the one or more packages during the transport of the one or more end users 12 to the end users' destination locations.

As further illustrated in FIG. 5, operational flow 500 may further include a transportation vehicle unit directing operation 506 for directing the one or more identified transportation vehicle units to rendezvous with the one or more end users in order to transport the one or more end users to the one or more destination locations. For instance, the transportation vehicle unit directing module 206* (e.g., the transportation vehicle unit directing module 206' of FIG. 2A or the transportation vehicle unit directing module 206" of FIG. 2B) of the transport coordinating system 10* of FIG. 2A or 2B directing the one or more identified transportation vehicle units 20 (e.g., transmitting directives or instructions to the one or more identified transportation vehicle units 20) to rendezvous with the one or more end users 12 (e.g., to meet the one or more end users 12 at a rendezvous location) in order to transport the one or more end users 12 to the one or more destination locations.

Figure 6A:
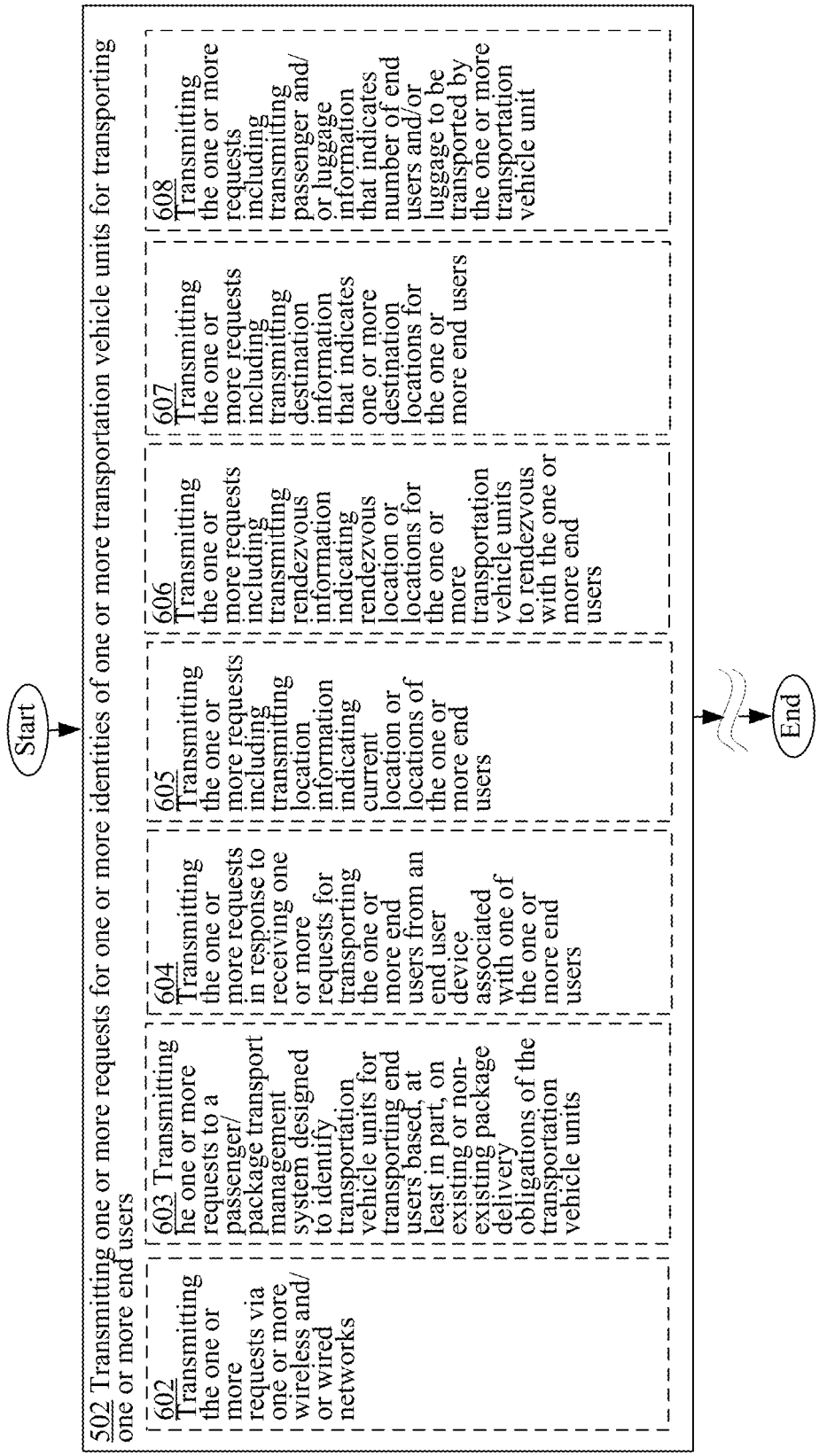
FIG. 6A is a high-level logic flowchart of a process depicting alternate implementations of the request transmitting operation 502 of FIG. 5.
Figure 6B:
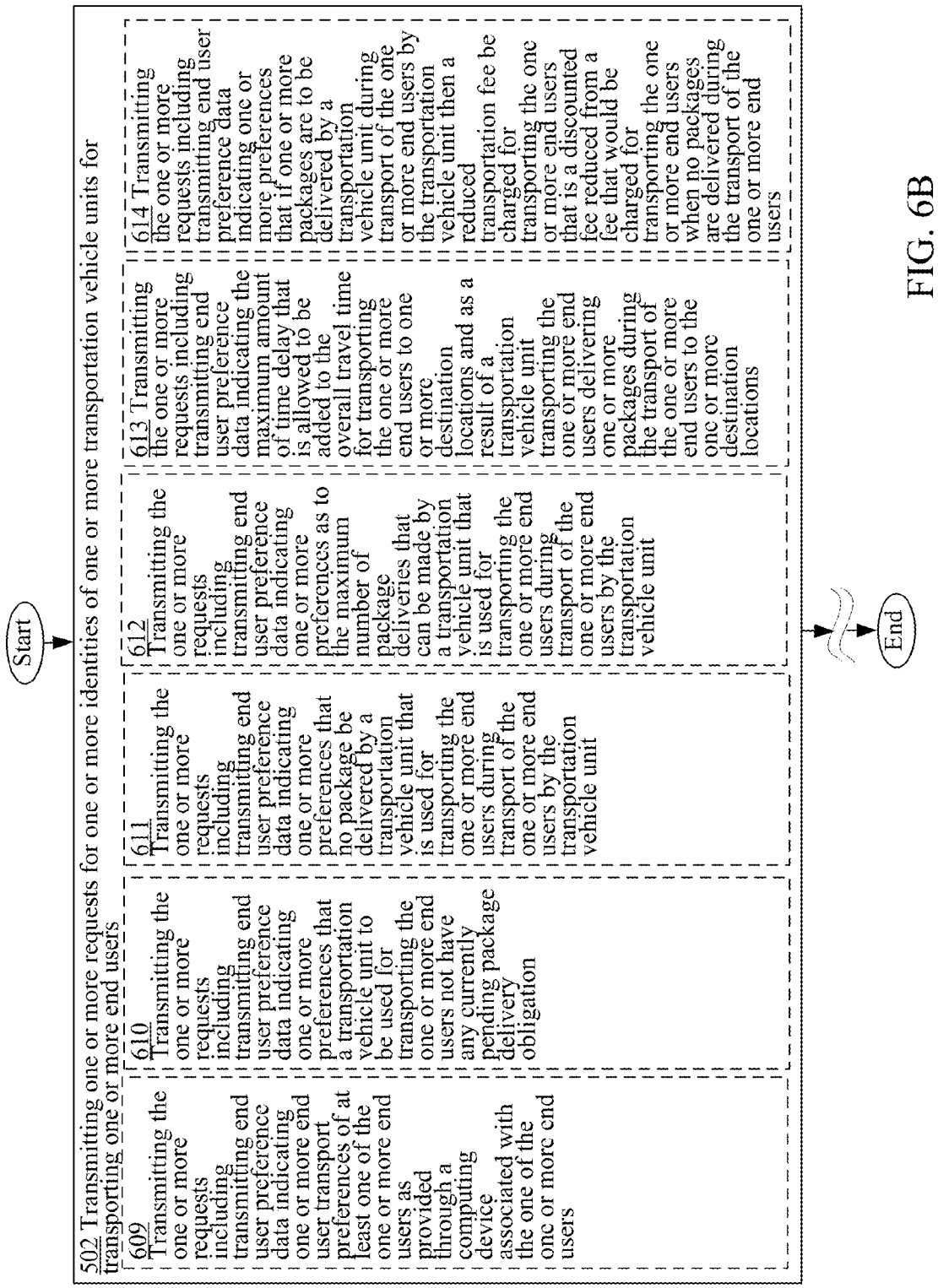
FIG. 6B is a high-level logic flowchart of a process depicting alternate implementations of the request transmitting operation 502 of FIG. 5.
Figure 6C:
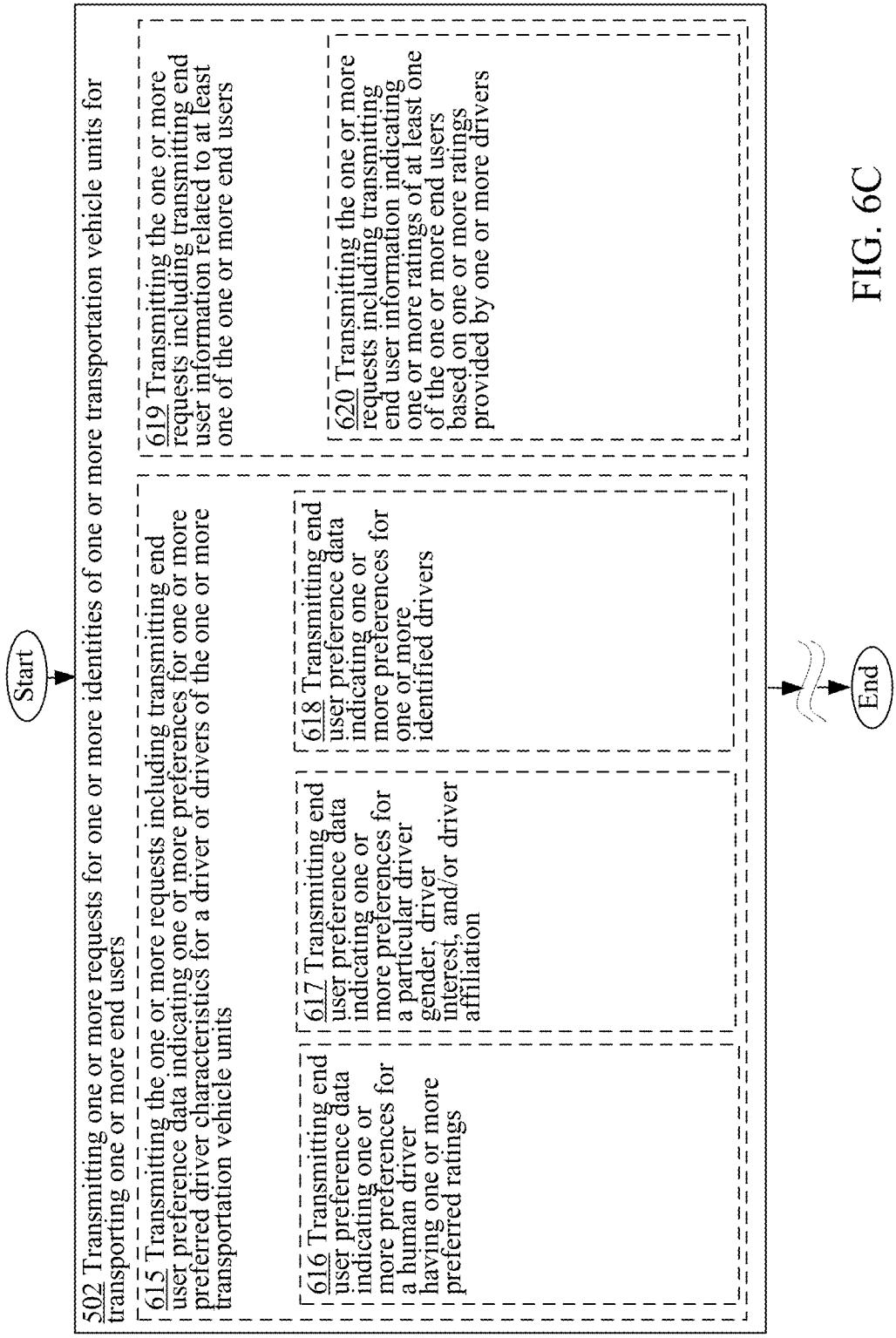
FIG. 6C is a high-level logic flowchart of a process depicting alternate implementations of the request transmitting operation 502 of FIG. 5.

As will be described below, the request transmitting operation 502, the transportation vehicle unit identity receiving operation 504, and the transportation vehicle unit directing operation 506 may be executed in a variety of different ways in various alternative implementations. FIGS. 6A, 6B, and 6C, for example, illustrate at least some of the alternative ways that the request transmitting operation 502 of FIG. 5 may be executed in various alternative implementations.

In some cases, for example, the request transmitting operation 502 may include an operation 602 for transmitting the one or more requests via one or more wireless and/or wired networks as illustrated in FIG. 6A. For instance, the request transmitting module 202* of the transport coordinating system 10* (e.g., the transport coordinating system 10' of FIG. 2A or the transport coordinating system 10" of FIG. 2B) transmitting the one or more requests via one or more wireless and/or wired networks 18 (e.g., cellular data network, WLAN, WAN, MAN (metropolitan area network, Ethernet, etc.). In some cases, the request transmitting module 202* may control a network interface 240 in order to transmit the one or more requests.

In various implementations, the request transmitting operation 502 may include an operation 603 for transmitting the one or more requests to a passenger/package transport management system designed to identify transportation vehicle units for transporting end users based, at least in part, on existing or non-existing package delivery obligations of the transportation vehicle units. For instance, the request transmitting module 202* of the transport coordinating system 10* of FIG. 2A or 2B transmitting the one or more requests to a passenger/package transport management system 16 (e.g., one or more network devices such as one or more servers) designed to identify transportation vehicle units 20 for transporting end users 12 based, at least in part, on existing or non-existing package delivery obligations of the transportation vehicle units 20.

In the same or alternative implementations, the request transmitting operation 502 may alternatively or additionally include an operation 604 for transmitting the one or more requests in response to receiving one or more requests for transporting the one or more end users from an end user device associated with one of the one or more end users. For instance, the request transmitting module 202* including the end user request receiving module 302 (see FIG. 3A) of the transport coordinating system 10* of FIG. 2A or 2B transmitting the one or more requests in response to, for example, the end user request receiving module 302 receiving one or more requests for transporting the one or more end users 12 from an end user device 14 (e.g., a Smartphone, a tablet computer, a personal computer, and so forth) associated with at least one of the one or more end users 12.

In the same or alternative implementations, the request transmitting operation 502 may alternatively or additionally include an operation 605 for transmitting the one or more requests including transmitting location information indicating current location or locations of the one or more end users. For instance, the request transmitting module 202* of the transport coordinating system 10* of FIG. 2A or 2B transmitting the one or more requests including transmitting to, for example, a passenger/package transport management system 16, location information (e.g., GPS data) indicating current location or locations of the one or more end users 12.

In the same or alternative implementations, the request transmitting operation 502 may alternatively or additionally include an operation 606 for transmitting the one or more requests including transmitting rendezvous information indicating rendezvous location or locations for the one or more transportation vehicle units to rendezvous with the one or more end users. For instance, the request transmitting module 202* of the transport coordinating system 10* of FIG. 2A or 2B transmitting the one or more requests including transmitting rendezvous information indicating rendezvous location or locations for the one or more transportation vehicle units 20 to rendezvous with the one or more end users 12.

In the same or alternative implementations, the request transmitting operation 502 may alternatively or additionally include an operation 607 for transmitting the one or more requests including transmitting destination information that indicates one or more destination locations for the one or more end users. For instance, the request transmitting module 202* of the transport coordinating system 10* of FIG. 2A or 2B transmitting the one or more requests including transmitting destination information that indicates one or more destination locations for the one or more end users 12.

In the same or alternative implementations, the request transmitting operation 502 may alternatively or additionally include an operation 608 for transmitting the one or more requests including transmitting passenger and/or luggage information that indicates number of end users and/or luggage to be transported by the one or more transportation vehicle unit. For instance, the request transmitting module 202* of the transport coordinating system 10* of FIG. 2A or 2B transmitting the one or more requests including transmitting passenger and/or luggage information that indicates number of end users and/or luggage (as well as, in some cases, the size or sizes of the luggage) to be transported by the one or more transportation vehicle unit 20.

Turning to FIG. 6B, in the same or alternative implementations, the request transmitting operation 502 may alternatively or additionally include an operation 609 for transmitting the one or more requests including transmitting end user preference data indicating one or more end user transport preferences of at least one of the one or more end users as provided through a computing device associated with the one of the one or more end users. For instance, the request transmitting module 202* including the end user preference data transmitting module 304 (see FIG. 3A) of the transport coordinating system 10* of FIG. 2A or 2B transmitting the one or more requests including transmitting, by the end user preference data transmitting module 304 and to, for example, a passenger/package transport management system 16, end user preference data indicating one or more end user transport preferences (e.g., preference related to drivers or transportation vehicle) of at least one of the one or more end users 12 as provided through a computing device (e.g., end user device 14 of FIG. 1) associated with the one of the one or more end users 12.

In the same or alternative implementations, the request transmitting operation 502 may alternatively or additionally include an operation 610 for transmitting the one or more requests including transmitting end user preference data indicating one or more preferences that a transportation vehicle unit to be used for transporting the one or more end users not have any currently pending package delivery obligation. For instance, the request transmitting module 202* including the end user preference data transmitting module 304 of the transport coordinating system 10* of FIG. 2A or 2B transmitting the one or more requests including transmitting, by the end user preference data transmitting module 304 and to, for example, a passenger/package transport management system 16, end user preference data indicating one or more preferences that a transportation vehicle unit 20 to be used for transporting the one or more end users 12 not have any currently pending package delivery obligation.

In the same or alternative implementations, the request transmitting operation 502 may alternatively or additionally include an operation 611 for transmitting the one or more requests including transmitting end user preference data indicating one or more preferences that no package be delivered by a transportation vehicle unit that is used for transporting the one or more end users during transport of the one or more end users by the transportation vehicle unit. For instance, the request transmitting module 202* including the end user preference data transmitting module 304 of the transport coordinating system 10* of FIG. 2A or 2B transmitting the one or more requests including transmitting, by the end user preference data transmitting module 304 and to, for example, a passenger/package transport management system 16, end user preference data indicating one or more preferences that no package be delivered by a transportation vehicle unit 20 that is used for transporting the one or more end users 12 during transport of the one or more end users 12 by the transportation vehicle unit 20.

In the same or alternative implementations, the request transmitting operation 502 may alternatively or additionally include an operation 612 for transmitting the one or more requests including transmitting end user preference data indicating one or more preferences as to the maximum number of package deliveries that can be made by a transportation vehicle unit that is used for transporting the one or more end users during transport of the one or more end users by the transportation vehicle unit. For instance, the request transmitting module 202* including the end user preference data transmitting module 304 of the transport coordinating system 10* of FIG. 2A or 2B transmitting the one or more requests including transmitting, by the end user preference data transmitting module 304 and to, for example, a passenger/package transport management system 16, end user preference data indicating one or more preferences as to the maximum number of package deliveries (e.g., one package delivery) that can be made by a transportation vehicle unit 20 that is used for transporting the one or more end users 12 during transport of the one or more end users 12 by the transportation vehicle unit 20. For example, in some cases, the one or more of the end users 12 may permit their transportation vehicle unit 20 to make a limited number of package deliveries (e.g., one delivery) during the transport of the one or more end users 12 (e.g., in exchange a discounted transportation fee). In other cases, however, the one or more end users 12 may prefer that the transportation vehicle unit 20 that they use for transportation in order to reach their destination location[s] make no package deliveries during their transport to their destination location[s].

In the same or alternative implementations, the request transmitting operation 502 may alternatively or additionally include an operation 613 for transmitting the one or more requests including transmitting end user preference data indicating the maximum amount of time delay that is allowed to be added to the overall travel time for transporting the one or more end users to one or more destination locations and as a result of a transportation vehicle unit transporting the one or more end users delivering one or more packages during the transport of the one or more end users to the one or more destination locations. For instance, the request transmitting module 202* including the end user preference data transmitting module 304 of the transport coordinating system 10* of FIG. 2A or 2B transmitting the one or more requests including transmitting, by the end user preference data transmitting module 304 and to, for example, a passenger/package transport management system 16, end user preference data indicating the maximum amount of time delay (e.g., 15 minutes) that is allowed to be added to the overall travel time for transporting the one or more end users 12 to one or more destination locations and as a result of a transportation vehicle unit transporting the one or more end users detouring in order to deliver one or more packages during the transport of the one or more end users 12 to the one or more destination locations.

In the same or alternative implementations, the request transmitting operation 502 may alternatively or additionally include an operation 614 for transmitting the one or more requests including transmitting end user preference data indicating one or more preferences that if one or more packages are to be delivered by a transportation vehicle unit during transport of the one or more end users by the transportation vehicle unit then a reduced transportation fee be charged for transporting the one or more end users that is a discounted fee reduced from a fee that would be charged for transporting the one or more end users when no packages are delivered during the transport of the one or more end users. For instance, the request transmitting module 202* including the end user preference data transmitting module 304 of the transport coordinating system 10* of FIG. 2A or 2B transmitting the one or more requests including transmitting, by the end user preference data transmitting module 304 and to, for example, a passenger/package transport management system 16, end user preference data indicating one or more preferences that if one or more packages are to be delivered by a transportation vehicle unit during transport of the one or more end users by the transportation vehicle unit then a reduced transportation fee be charged for transporting the one or more end users 12 that is a discounted fee reduced from a fee that would be charged for transporting the one or more end users when no packages are delivered during the transport of the one or more end users 12.

Referring now to FIG. 6C, in various implementations, the request transmitting operation 502 may alternatively or additionally include an operation 615 for transmitting the one or more requests including transmitting end user preference data indicating one or more preferences for one or more preferred driver characteristics for a driver or drivers of the one or more transportation vehicle units. For instance, the request transmitting module 202* including the end user preference data transmitting module 304 of the transport coordinating system 10* of FIG. 2A or 2B transmitting the one or more requests including transmitting, by the end user preference data transmitting module 304 and to, for example, a passenger/package transport management system 16, end user preference data indicating one or more preferences (e.g., driver characteristics) for one or more preferred driver characteristics for a driver or drivers of the one or more transportation vehicle units 20.

In some implementations, operation 615 may further include one or more additional operations including, in some cases, an operation 616 for transmitting end user preference data indicating one or more preferences for a human driver having one or more preferred ratings. For instance, the end user preference data transmitting module 304 of the transport coordinating system 10* of FIG. 2A or 2B transmitting end user preference data indicating one or more preferences for a human driver having one or more preferred ratings (e.g., driver rating based on driver ratings provided by previous customers/passengers, e.g., other end users).

In the same or alternative implementations, operation 615 may additionally or alternatively include an operation 617 for transmitting end user preference data indicating one or more preferences for a particular driver gender, driver interest, and/or driver affiliation. For instance, the end user preference data transmitting module 304 of the transport coordinating system 10* of FIG. 2A or 2B transmitting end user preference data indicating one or more preferences for a particular driver gender (e.g., male driver), driver interest (e.g., NEW YORK JETS), and/or driver affiliation (e.g., religious or civic affiliation).

In the same or alternative implementations, operation 615 may additionally or alternatively include an operation 618 for transmitting end user preference data indicating one or more preferences for one or more identified drivers. For instance, the end user preference data transmitting module 304 of the transport coordinating system 10* of FIG. 2A or 2B transmitting end user preference data indicating one or more preferences for one or more identified drivers.

In the same or alternative implementations, the request transmitting operation 502 may alternatively or additionally include an operation 619 for transmitting the one or more requests including transmitting end user information related to at least one of the one or more end users. For instance, the request transmitting module 202* including the end user information transmitting module 306 (see FIG. 3A) of the transport coordinating system 10* of FIG. 2A or 2B transmitting the one or more requests including transmitting, by the end user information transmitting module 306 and to, for example, a passenger/package transport management system 16, end user information related to at least one of the one or more end users.

In some cases, operation 619 may further include an operation 620 for transmitting the one or more requests including transmitting end user information indicating one or more ratings of at least one of the one or more end users based on one or more ratings provided by one or more drivers. For instance, the request transmitting module 202* including the end user information transmitting module 306 of the transport coordinating system 10* of FIG. 2A or 2B transmitting the one or more requests including transmitting, by the end user information transmitting module 306, end user information indicating one or more ratings of at least one of the one or more end users 12 based on data of one or more ratings provided by one or more drivers.

Figure 7A:
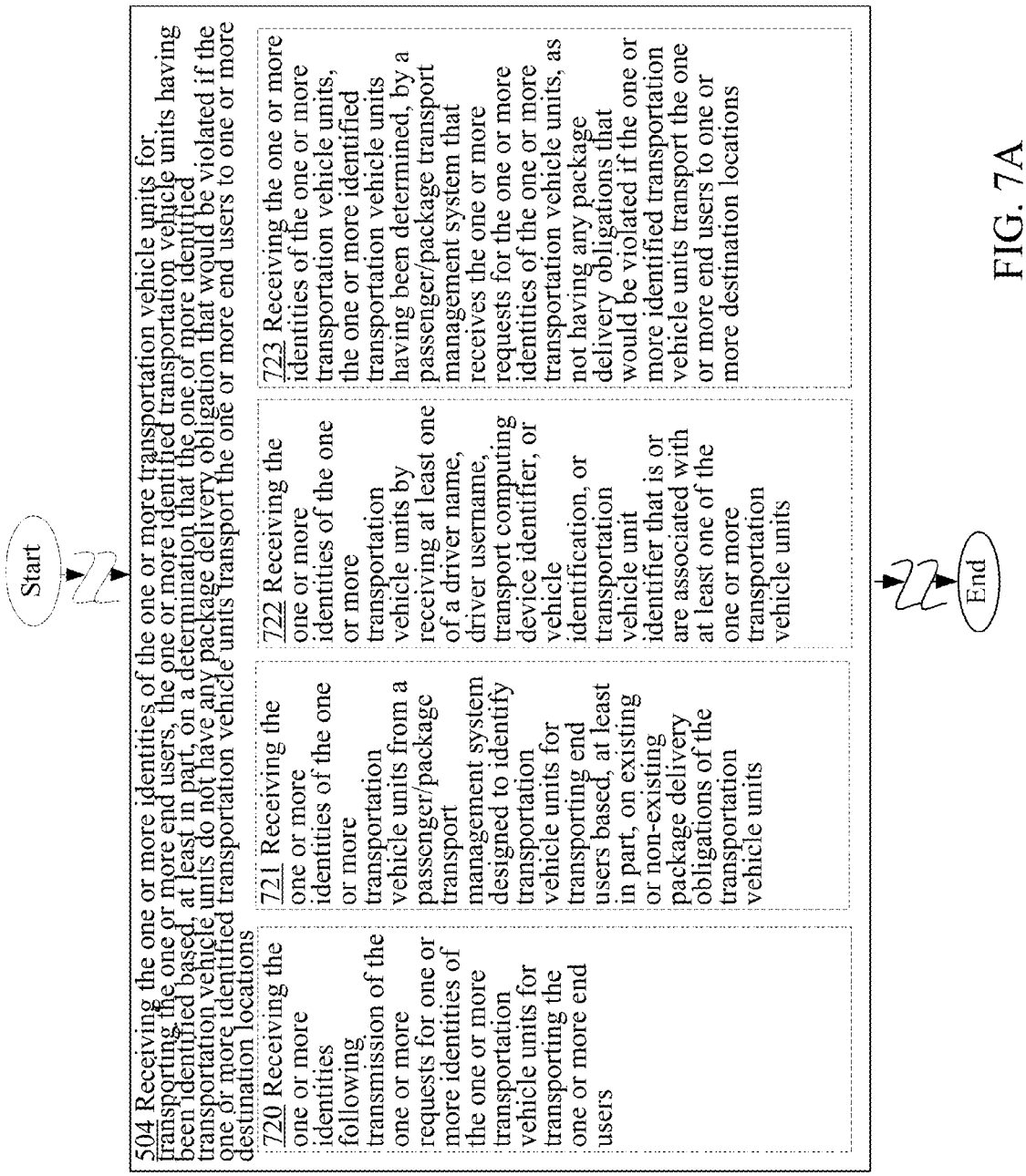
FIG. 7A is a high-level logic flowchart of a process depicting alternate implementations of the transportation vehicle unit identity receiving operation 504 of FIG. 5.

Referring back to the transportation vehicle unit identity receiving operation 504 of FIG. 5, the transportation vehicle unit identity receiving operation 504 similar to the request transmitting operation 502 of FIG. 5 may be executed in a number of different ways in various alternative embodiments as illustrated, for example, in FIGS. 7A, 7B, 7C, 7D, 7E, 7F, 7G, and 7H. In some cases, for example, the transportation vehicle unit identity receiving operation 504 may actually include an operation 720 for receiving (e.g., acquiring) the one or more identities following transmission of the one or more requests for one or more identities of the one or more transportation vehicle units for transporting the one or more end users as illustrated in FIG. 7A. For instance, the transportation vehicle unit identity acquiring module 204* of the transport coordinating system 10* of FIG. 2A or 2B receiving the one or more identities following (e.g., as a result of or in response to) transmission of the one or more requests for the one or more identities of the one or more transportation vehicle units for transporting the one or more end users 12.

In the same or alternative implementations, the transportation vehicle unit identity receiving operation 504 may include an operation 721 for receiving the one or more identities of the one or more transportation vehicle units from a passenger/package transport management system designed to identify transportation vehicle units for transporting end users based, at least in part, on existing or non-existing package delivery obligations of the transportation vehicle units. For instance, the transportation vehicle unit identity acquiring module 204* of the transport coordinating system 10* of FIG. 2A or 2B receiving or acquiring the one or more identities of the one or more transportation vehicle units 20 from a passenger/package transport management system 16, the passenger/package transport management system 16 being designed to identify transportation vehicle units 20 for transporting end users 12 based, at least in part, on existing or non-existing package delivery obligations of the identified transportation vehicle units 20. In some cases, the one or more identities that may be received or acquired may be in the form of directives that direct the one or more identified transportation vehicle units 20 to rendezvous with the one or more end users 12 at one or more rendezvous locations in order to transport the one or more end users 12 to their destination locations.

In the same or alternative implementations, the transportation vehicle unit identity receiving operation 504 may include an operation 722 for receiving the one or more identities of the one or more transportation vehicle units by receiving at least one of a driver name, driver username, transport computing device identifier, vehicle identification, or transportation vehicle unit identifier that is or are associated with at least one of the one or more transportation vehicle units. For instance, the transportation vehicle unit identity acquiring module 204* of the transport coordinating system 10* of FIG. 2A or 2B receiving (e.g., acquiring) the one or more identities of the one or more transportation vehicle units 20 by receiving or acquiring at least one of a driver name, driver username, transport computing device identifier, vehicle identification, or transportation vehicle unit identifier that is or are associated with at least one of the one or more transportation vehicle units.

In the same or alternative implementations, the transportation vehicle unit identity receiving operation 504 may include an operation 723 for receiving the one or more identities of the one or more transportation vehicle units, the one or more identified transportation vehicle units having been determined, by a passenger/package transport management system that receives the one or more requests for the one or more identities of the one or more transportation vehicle units, as not having any package delivery obligations that would be violated if the one or more identified transportation vehicle units transport the one or more end users to one or more destination locations. For instance, the transportation vehicle unit identity acquiring module 204* of the transport coordinating system 10* of FIG. 2A or 2B receiving or acquiring the one or more identities of the one or more transportation vehicle units 20, the one or more identified transportation vehicle units 20 having been determined, by a passenger/package transport management system 16 that receives the one or more requests for the one or more identities of the one or more transportation vehicle units 20, as not having any package delivery obligations that would be violated if the one or more identified transportation vehicle units 20 transport the one or more end users 12 to one or more destination locations.

For example, suppose an exemplary transportation vehicle unit 20 has a package delivery obligation that requires the exemplary transportation vehicle unit 20 to deliver a particular package by a certain time. Suppose further that if the exemplary transportation vehicle unit 20 was assigned to transport the one or more end users 12 to their destination location or locations but by doing so, the exemplary transportation vehicle unit 20 would not be able to deliver the particular package on time, then the exemplary transportation vehicle unit 20 would not be identified (e.g., assigned) for transporting the one or more end users 20. On the other hand, suppose the same exemplary transportation vehicle unit 20 has a package delivery obligation that requires the delivery of a package to a delivery location that is along or near the transport route (e.g., direct route from a rendezvous location to a destination location) used to transport the one or more end users 12 to their destination location or locations, and if the exemplary transportation vehicle unit 20 is permitted (e.g., permitted by the one or more end users 12) to deliver the package during the transport of the one or more end users 12, then the exemplary transportation vehicle unit 20 may be identified (e.g., selected) for transporting the one or more end users 12 to their destination location or locations.

Figure 7B:
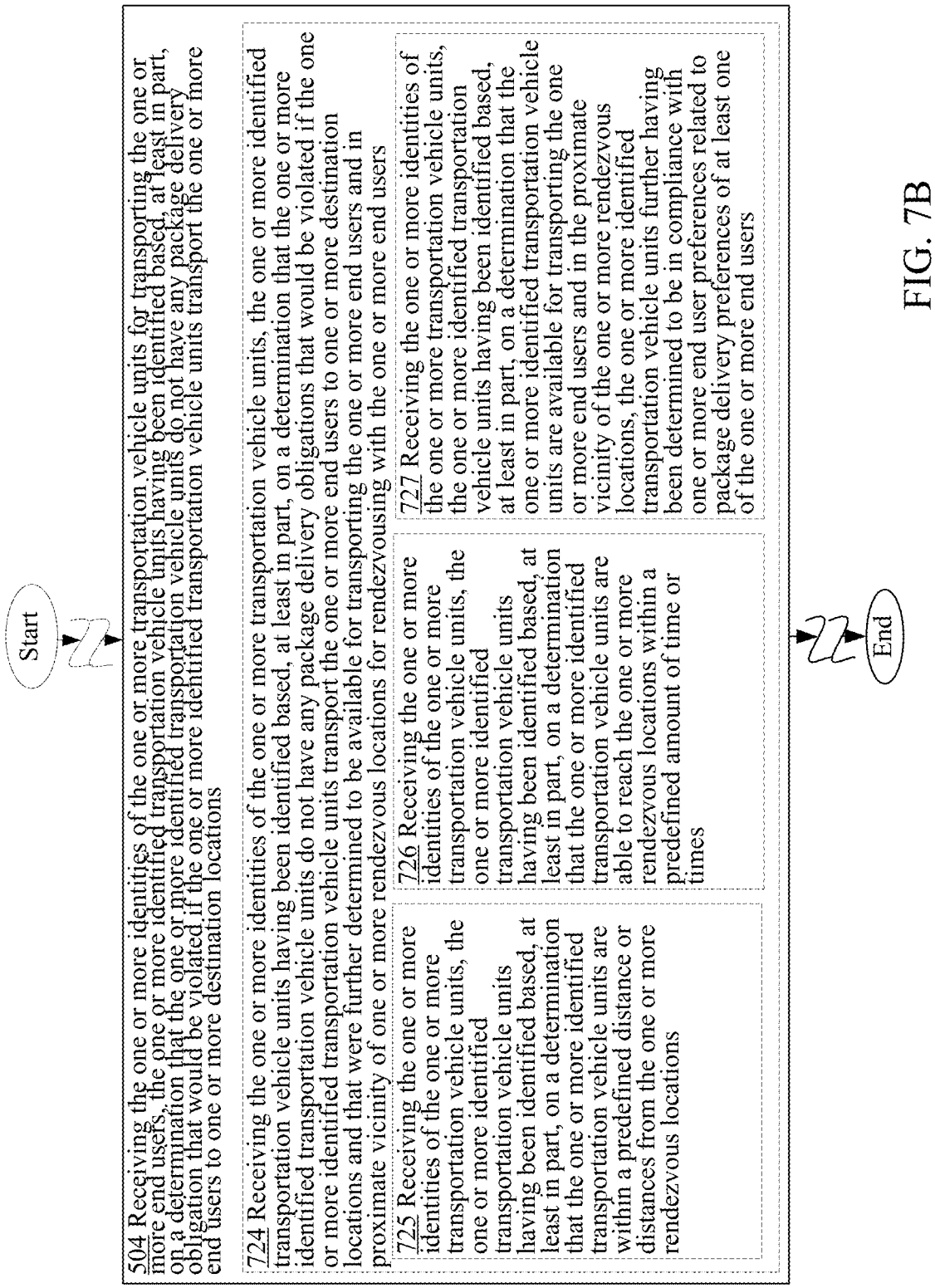
FIG. 7B is a high-level logic flowchart of a process depicting alternate implementations of the transportation vehicle unit identity receiving operation 504 of FIG. 5.

Referring now to FIG. 7B, in some implementations, the transportation vehicle unit identity receiving operation 504 may include an operation 724 for receiving the one or more identities of the one or more transportation vehicle units, the one or more identified transportation vehicle units having been identified based, at least in part, on a determination that the one or more identified transportation vehicle units do not have any package delivery obligations that would be violated if the one or more identified transportation vehicle units transport the one or more end users to one or more destination locations and that were further determined to be available for transporting the one or more end users and in proximate vicinity of one or more rendezvous locations for rendezvousing with the one or more end users. For instance, the transportation vehicle unit identity acquiring module 204\* of the transport coordinating system 10\* of FIG. 2A or 2B receiving or acquiring the one or more identities of the one or more transportation vehicle units 20, the one or more identified transportation vehicle units having been identified based, at least in part, on a determination (e.g., as determined by, for example, a passenger/package transport management system 16) that the one or more identified transportation vehicle units 20 do not have any package delivery obligations that would be violated if the one or more identified transportation vehicle units 20 transport the one or more end users 12 to one or more destination locations and that were further determined (e.g., as determined by, for example, a passenger/package transport management system 16) to be available (e.g., not carrying any passengers or is about to drop off passengers) for transporting the one or more end users 12 and determined to be in proximate vicinity (e.g., within two miles) of one or more rendezvous locations for rendezvousing with the one or more end users 12.

As further illustrated in FIG. 7B, in various implementations, operation 724 may include one or more additional operations including, in some cases, an operation 725 for receiving the one or more identities of the one or more transportation vehicle units, the one or more identified transportation vehicle units having been identified based, at least in part, on a determination that the one or more identified transportation vehicle units are within a predefined distance or distances from the one or more rendezvous locations. For instance, the transportation vehicle unit identity acquiring module 204\* of the transport coordinating system 10\* of FIG. 2A or 2B receiving (e.g., acquiring) the one or more identities of the one or more transportation vehicle units 20, the one or more identified transportation vehicle units 20 having been identified based, at least in part, on a determination (e.g., as determined by, for example, a passenger/package transport management system 16) that the one or more identified transportation vehicle units 20 are within a predefined distance or distances (e.g., 2.5 miles) from the one or more rendezvous locations.

In the same or alternative implementations, operation 724 may include an operation 726 for receiving the one or more identities of the one or more transportation vehicle units, the one or more identified transportation vehicle units having been identified based, at least in part, on a determination that the one or more identified transportation vehicle units are able to reach the one or more rendezvous locations within a predefined amount of time or times. For instance, the transportation vehicle unit identity acquiring module 204\* of the transport coordinating system 10\* of FIG. 2A or 2B receiving (e.g., acquiring) the one or more identities of the one or more transportation vehicle units 20, the one or more identified transportation vehicle units 20 having been identified based, at least in part, on a determination (e.g., as determined by, for example, a passenger/package transport management system 16) that the one or more identified transportation vehicle units 20 are able to reach the one or more rendezvous locations within a predefined amount of time or times (e.g., the one or more identified transportation vehicle units 20 determined to be able to reach the rendezvous location from their current location or locations within 10 minutes).

In the same or alternative implementations, operation 724 may include an operation 727 for receiving the one or more identities of the one or more transportation vehicle units, the one or more identified transportation vehicle units having been identified based, at least in part, on a determination that the one or more identified transportation vehicle units are available for transporting the one or more end users and in the proximate vicinity of the one or more rendezvous locations, the one or more identified transportation vehicle units further having been determined to be in compliance with one or more end user preferences related to package delivery preferences of at least one of the one or more end users. For instance, the transportation vehicle unit identity acquiring module 204\* of the transport coordinating system 10\* of FIG. 2A or 2B receiving (e.g., acquiring) the one or more identities of the one or more transportation vehicle units 20, the one or more identified transportation vehicle units 20 having been identified based, at least in part, on a determination (e.g., as determined by, for example, a passenger/package transport management system 16) that the one or more identified transportation vehicle units 20 are available (e.g., not currently carrying passengers or is about drop off passengers) for transporting the one or more end users 12 and in the proximate vicinity (e.g., within 1.5 miles) of the one or more rendezvous locations, the one or more identified transportation vehicle units 20 further having been determined to be in compliance with one or more end user preferences related to package delivery preferences (e.g., no package obligations to deliver packages during transport of the one or more end users 12 or having only an obligation to deliver only one package during transport of the one or more end users 12) of at least one of the one or more end users 12.

Figure 7C:
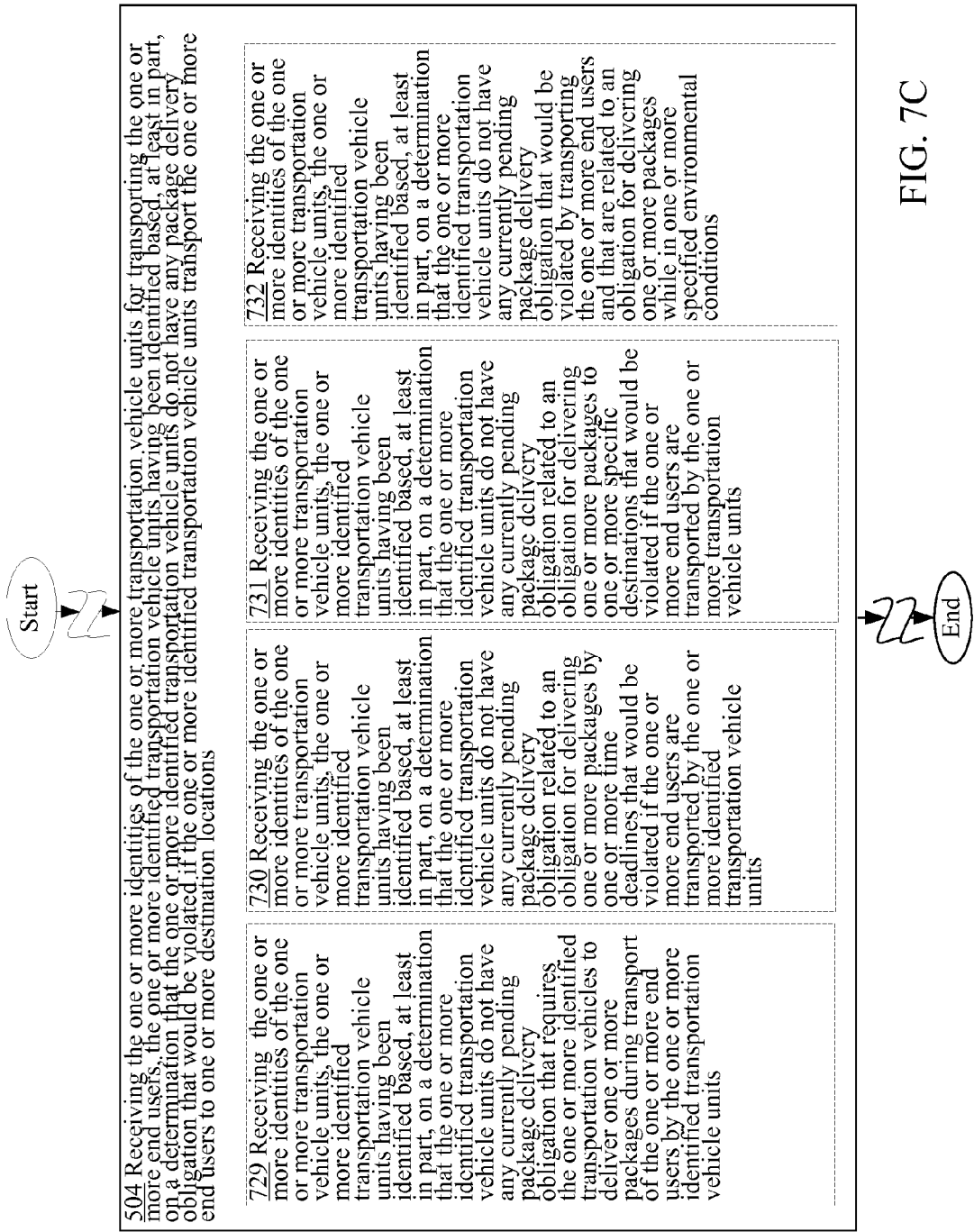
FIG. 7C is a high-level logic flowchart of a process depicting alternate implementations of the transportation vehicle unit identity receiving operation 504 of FIG. 5.

Turning to FIG. 7C, in some implementations, the transportation vehicle unit identity receiving operation 504 may include an operation 729 for receiving the one or more identities of the one or more transportation vehicle units, the one or more identified transportation vehicle units having been identified based, at least in part, on a determination that the one or more identified transportation vehicle units do not have any currently pending package delivery obligation that requires the one or more identified transportation vehicles to deliver one or more packages during transport of the one or more end users by the one or more identified transportation vehicle units. For instance, the transportation vehicle unit identity acquiring module 204* of the transport coordinating system 10* of FIG. 2A or 2B receiving (e.g., acquiring) the one or more identities of the one or more transportation vehicle units 20, the one or more identified transportation vehicle units 20 having been identified based, at least in part, on a determination (e.g., as determined by, for example, a passenger/package transport management system 16) that the one or more identified transportation vehicle units 20 do not have any currently pending package delivery obligation that requires the one or more identified transportation vehicles 20 to deliver one or more packages during transport of the one or more end users 12 by the one or more identified transportation vehicle units 20.

In the same or alternative implementations, the transportation vehicle unit identity receiving operation 504 may additionally or alternatively include an operation 730 for receiving the one or more identities of the one or more transportation vehicle units, the one or more identified transportation vehicle units having been identified based, at least in part, on a determination that the one or more identified transportation vehicle units do not have any currently pending package delivery obligation related to an obligation for delivering one or more packages by one or more time deadlines that would be violated if the one or more end users are transported by the one or more identified transportation vehicle units. For instance, the transportation vehicle unit identity acquiring module 204* of the transport coordinating system 10* of FIG. 2A or 2B receiving (e.g., acquiring) the one or more identities of the one or more transportation vehicle units 20, the one or more identified transportation vehicle units 20 having been identified based, at least in part, on a determination (e.g., as determined by, for example, a passenger/package transport management system 16) that the one or more identified transportation vehicle units 20 do not have any currently pending package delivery obligation related to an obligation for delivering one or more packages by one or more time deadlines that would be violated if the one or more end users 12 are transported by the one or more identified transportation vehicle units 20. For example, if an exemplary transportation vehicle unit 20 has an obligation to deliver a particular package by a certain deadline and if the exemplary transportation vehicle unit 20 by being assigned to transport the one or more end users 12 would be prevented from delivering the particular package on time, than the exemplary transportation vehicle unit 20 would not be identified/assigned to transport the one or more end users 12.

In the same or alternative implementations, the transportation vehicle unit identity receiving operation 504 may additionally or alternatively include an operation 731 for receiving the one or more identities of the one or more transportation vehicle units, the one or more identified transportation vehicle units having been identified based, at least in part, on a determination that the one or more identified transportation vehicle units do not have any currently pending package delivery obligation related to an obligation for delivering one or more packages to one or more specific destinations that would be violated if the one or more end users are transported by the one or more transportation vehicle units. For instance, the transportation vehicle unit identity acquiring module 204* of the transport coordinating system 10* of FIG. 2A or 2B receiving (e.g., acquiring) the one or more identities of the one or more transportation vehicle units 20, the one or more identified transportation vehicle units 20 having been identified based, at least in part, on a determination (e.g., as determined by, for example, a passenger/package transport management system 16) that the one or more identified transportation vehicle units 20 do not have any currently pending package delivery obligation related to an obligation for delivering one or more packages to one or more specific destinations that would be violated if the one or more end users 12 are transported by the one or more transportation vehicle units 20.

In the same or alternative implementations, the transportation vehicle unit identity receiving operation 504 may additionally or alternatively include an operation 732 for receiving the one or more identities of the one or more transportation vehicle units, the one or more identified transportation vehicle units having been identified based, at least in part, on a determination that the one or more identified transportation vehicle units do not have any currently pending package delivery obligation that would be violated by transporting the one or more end users and that are related to an obligation for delivering one or more packages while in one or more specified environmental conditions. For instance, the transportation vehicle unit identity acquiring module 204* of the transport coordinating system 10* of FIG. 2A or 2B receiving (e.g., acquiring) the one or more identities of the one or more transportation vehicle units 20, the one or more identified transportation vehicle units 20 having been identified based, at least in part, on a determination (e.g., as determined by, for example, a passenger/package transport management system 16) that the one or more identified transportation vehicle units 20 do not have any currently pending package delivery obligation that would be violated by transporting the one or more end users 12 and that are related to an obligation for delivering one or more packages while in one or more specified environmental conditions. For example, if the one or more end users 12 prefer no air-conditioning in their transportation vehicle and if a transportation vehicle unit 20 is obligated to transport a package in an air-conditioned environment, then that transportation vehicle unit 20 would not be selected for transporting the one or more end users 12.

Figure 7D:
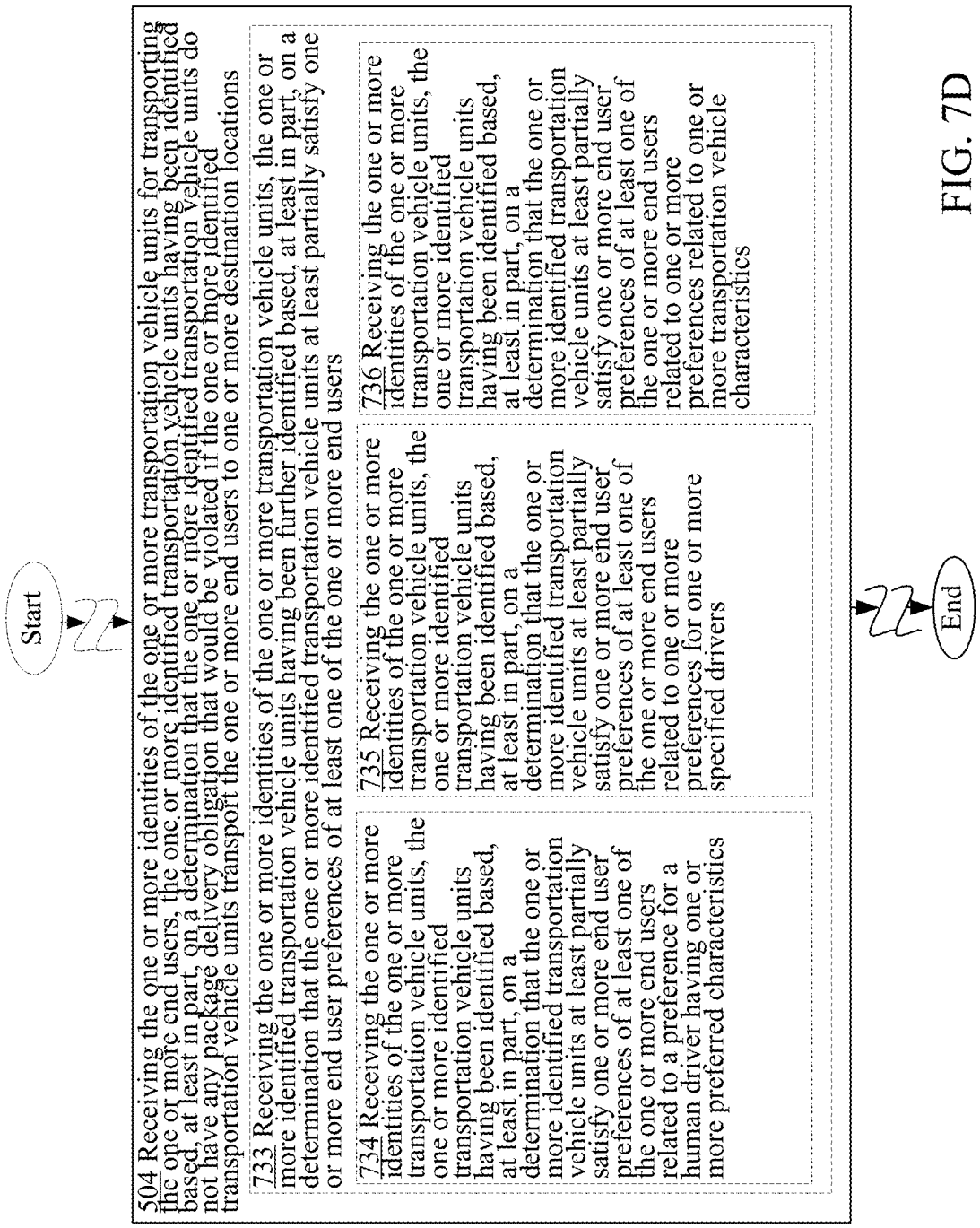
FIG. 7D is a high-level logic flowchart of a process depicting alternate implementations of the transportation vehicle unit identity receiving operation 504 of FIG. 5.

In various implementations, the transportation vehicle unit identity receiving operation 504 may include an operation 733 for receiving the one or more identities of the one or more transportation vehicle units, the one or more identified transportation vehicle units having been further identified based, at least in part, on a determination that the one or more identified transportation vehicle units at least partially satisfy one or more end user preferences of at least one of the one or more end users as illustrated in FIG. 7D. For instance, the transportation vehicle unit identity acquiring module 204* of the transport coordinating system 10* of FIG. 2A or 2B receiving or acquiring the one or more identities of the one or more transportation vehicle units 20, the one or more identified transportation vehicle units 20 having been further identified based, at least in part, on a determination (e.g., as determined by, for example, a passenger/package transport management system 16) that the one or more identified transportation vehicle units at least partially satisfy one or more end user preferences (e.g., satisfying driver preferences of the one or more end users 12 but not satisfy vehicle preferences of the one or more end users 12) of at least one of the one or more end users 12.

As further illustrated in FIG. 7D, operation 733 in various implementations may include one or more additional operations including, in some cases, an operation 734 for receiving the one or more identities of the one or more transportation vehicle units, the one or more identified transportation vehicle units having been identified based, at least in part, on a determination that the one or more identified transportation vehicle units at least partially satisfy one or more end user preferences of at least one of the one or more end users related to a preference for a human driver having one or more preferred characteristics. For instance, the transportation vehicle unit identity acquiring module 204* of the transport coordinating system 10* of FIG. 2A or 2B receiving (e.g., acquiring) the one or more identities of the one or more transportation vehicle units 20, the one or more identified transportation vehicle units 20 having been identified based, at least in part, on a determination (e.g., as determined by, for example, a passenger/package transport management system 16) that the one or more identified transportation vehicle units 20 at least partially satisfy one or more end user preferences of at least one of the one or more end users 12 related to a preference for a human driver having one or more preferred characteristics (e.g., driver rating, gender, driver interest, and/or driver affiliation).

In the same or alternative implementations, operation 733 may additionally or alternatively include an operation 735 for receiving the one or more identities of the one or more transportation vehicle units, the one or more identified transportation vehicle units having been identified based, at least in part, on a determination that the one or more identified transportation vehicle units at least partially satisfy one or more end user preferences of at least one of the one or more end users related to one or more preferences for one or more specified drivers. For instance, the transportation vehicle unit identity acquiring module 204* of the transport coordinating system 10* of FIG. 2A or 2B receiving (e.g., acquiring) the one or more identities of the one or more transportation vehicle units 20, the one or more identified transportation vehicle units 20 having been identified based, at least in part, on a determination (e.g., as determined by, for example, a passenger/package transport management system 16) that the one or more identified transportation vehicle units 20 at least partially satisfy one or more end user preferences of at least one of the one or more end users 12 related to one or more preferences for one or more specified drivers (e.g., the one or more end users 12 may prefer only to use certain pre-approved drivers for their transportation needs).

In the same or alternative implementations, operation 733 may additionally or alternatively include an operation 736 for receiving the one or more identities of the one or more transportation vehicle units, the one or more identified transportation vehicle units having been identified based, at least in part, on a determination that the one or more identified transportation vehicle units at least partially satisfy one or more end user preferences of at least one of the one or more end users related to one or more preferences related to one or more transportation vehicle characteristics. For instance, the transportation vehicle unit identity acquiring module 204* of the transport coordinating system 10* of FIG. 2A or 2B receiving (e.g., acquiring) the one or more identities of the one or more transportation vehicle units 20, the one or more identified transportation vehicle units 20 having been identified based, at least in part, on a determination (e.g., as determined by, for example, a passenger/package transport management system 16) that the one or more identified transportation vehicle units 20 at least partially satisfy one or more end user preferences of at least one of the one or more end users 12 related to one or more preferences related to one or more transportation vehicle characteristics (e.g., luxury car, luggage space, non-smoker vehicle, and so forth).

Figure 7E:
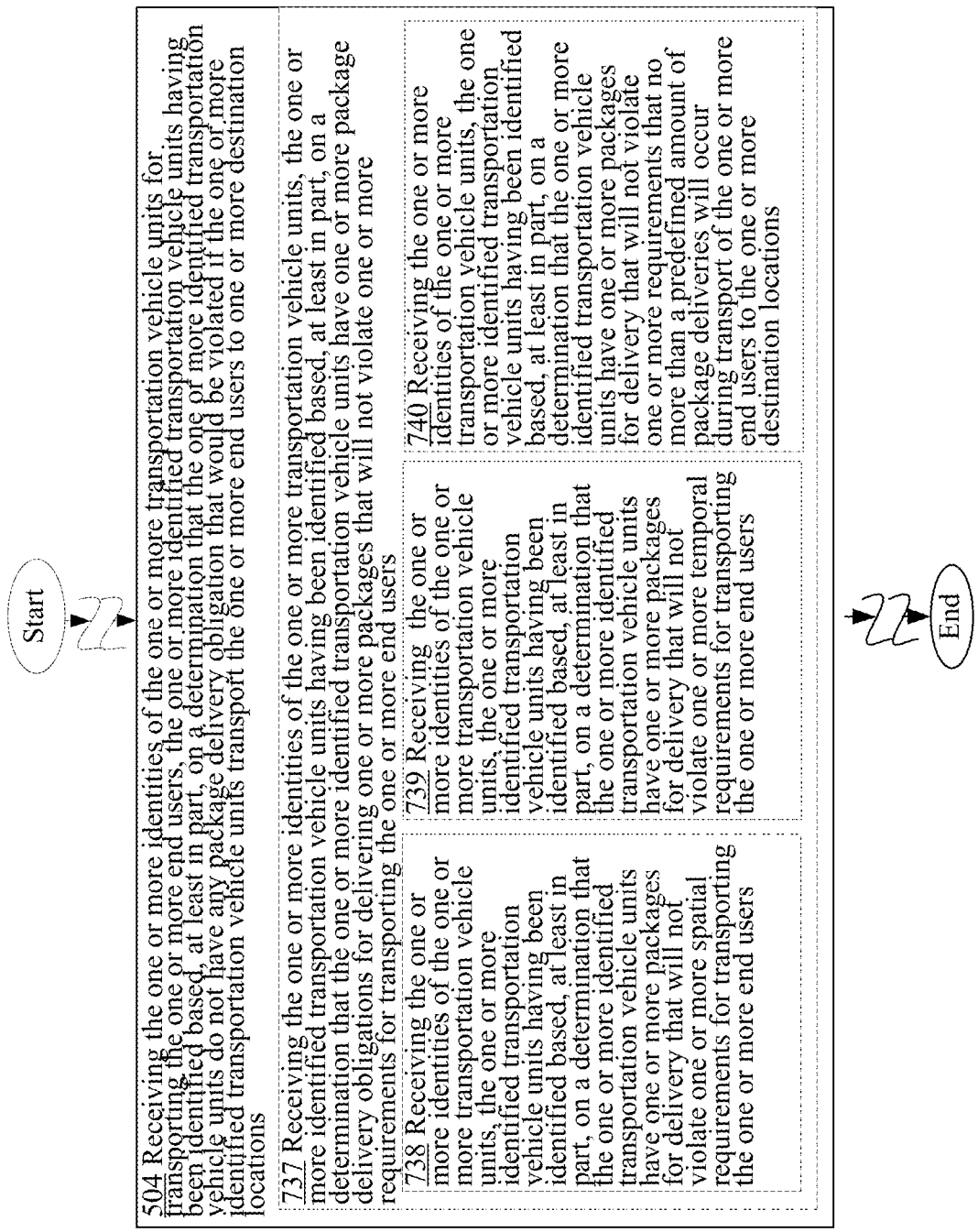
FIG. 7E is a high-level logic flowchart of a process depicting alternate implementations of the transportation vehicle unit identity receiving operation 504 of FIG. 5.

Referring to FIG. 7E, in various implementations, the transportation vehicle unit identity receiving operation 504 may include an operation 737 for receiving the one or more identities of the one or more transportation vehicle units, the one or more identified transportation vehicle units having been identified based, at least in part, on a determination that the one or more identified transportation vehicle units have one or more package delivery obligations for delivering one or more packages that will not violate one or more requirements for transporting the one or more end users. For instance, the transportation vehicle unit identity acquiring module 204* of the transport coordinating system 10* of FIG. 2A or 2B receiving the one or more identities of the one or more transportation vehicle units 20, the one or more identified transportation vehicle units 20 having been identified based, at least in part, on a determination (e.g., as determined by, for example, a passenger/package transport management system 16) that the one or more identified transportation vehicle units 20 have one or more package delivery obligations for delivering one or more packages that will not violate one or more requirements for transporting the one or more end users 12 (e.g., requirements for carrying certain number of passengers and/or luggage).

As further illustrated in FIGS. 7E and 7F, operation 737 may actually involve one or more additional operations including, in some cases, an operation 738 for receiving the one or more identities of the one or more transportation vehicle units, the one or more identified transportation vehicle units having been identified based, at least in part, on a determination that the one or more identified transportation vehicle units have one or more packages for delivery that will not violate one or more spatial requirements for transporting the one or more end users. For instance, the transportation vehicle unit identity acquiring module 204* of the transport coordinating system 10* of FIG. 2A or 2B receiving (e.g., acquiring) the one or more identities of the one or more transportation vehicle units 20, the one or more identified transportation vehicle units 20 having been identified based, at least in part, on a determination (e.g., as determined by, for example, a passenger/package transport management system 16) that the one or more identified transportation vehicle units 20 have one or more packages for delivery that will not violate one or more spatial requirements (e.g., requirements for passenger and/or luggage space) for transporting the one or more end users 12.

In some implementations, operation 737 may alternatively or additionally include an operation 739 for receiving the one or more identities of the one or more transportation vehicle units, the one or more identified transportation vehicle units having been identified based, at least in part, on a determination that the one or more identified transportation vehicle units have one or more packages for delivery that will not violate one or more temporal requirements for transporting the one or more end users. For instance, the transportation vehicle unit identity acquiring module 204* of the transport coordinating system 10* of FIG. 2A or 2B receiving the one or more identities of the one or more transportation vehicle units 20, the one or more identified transportation vehicle units 20 having been identified based, at least in part, on a determination (e.g., as determined by, for example, a passenger/package transport management system 16) that the one or more identified transportation vehicle units 20 have one or more packages for delivery that will not violate one or more temporal requirements (e.g., deadline for dropping off the end users 12) for transporting the one or more end users 12. For example, if a particular transportation vehicle unit 20 has an obligation to deliver a package that only requires that a package be delivered anytime during that particular day (e.g., so the package could be delivered after transporting the one or more end users 12) or that is to be delivered to a delivery location that is along the direct route to the destination location of the one or more end users 12 (and that the one or more end users 12 permit the delivery of a package during transport of the one or more end users 12), then that transportation vehicle unit 20 may be selected/identified for transporting the one or more end users 12.

In some implementations, operation 737 may alternatively or additionally include an operation 740 for receiving the one or more identities of the one or more transportation vehicle units, the one or more identified transportation vehicle units having been identified based, at least in part, on a determination that the one or more identified transportation vehicle units have one or more packages for delivery that will not violate one or more requirements that no more than a predefined amount of package deliveries will occur during transport of the one or more end users to the one or more destination locations. For instance, the transportation vehicle unit identity acquiring module 204* of the transport coordinating system 10* of FIG. 2A or 2B receiving (e.g., acquiring) the one or more identities of the one or more transportation vehicle units 20, the one or more identified transportation vehicle units 20 having been identified based, at least in part, on a determination (e.g., as determined by, for example, a passenger/package transport management system 16) that the one or more identified transportation vehicle units 20 have one or more packages for delivery that will not violate one or more requirements (e.g., end user preferences) that no more than a predefined amount of package deliveries (e.g., one delivery) will occur during transport of the one or more end users 12 to the one or more destination locations.

In some implementations, operation 737 may alternatively or additionally include an operation 741 for receiving the one or more identities of the one or more transportation vehicle units, the one or more identified transportation vehicle units having been identified based, at least in part, on a determination that the one or more identified transportation vehicle units have one or more packages for delivery to one or more delivery locations that are along or proximate to a direct route to one or more destination locations of the one or more end users from one or more rendezvous locations where the one or more end users rendezvous with the one or more identified transportation vehicle units in order to be transported to the one or more destination locations as illustrated in FIG. 7F. For instance, the transportation vehicle unit identity acquiring module 204* of the transport coordinating system 10* of FIG. 2A or 2B receiving or acquiring the one or more identities of the one or more transportation vehicle units 20, the one or more identified transportation vehicle units 20 having been identified based, at least in part, on a determination (e.g., as determined by, for example, a passenger/package transport management system 16) that the one or more identified transportation vehicle units 20 have one or more packages for delivery to one or more delivery locations that are along or proximate to a direct route (e.g., shortest route and/or most time efficient route) to one or more destination locations of the one or more end users 12 from one or more rendezvous locations where the one or more end users rendezvous with the one or more identified transportation vehicle units 20 in order to be transported to the one or more destination locations.

As further illustrated in FIG. 7F, operation 741 may actually include one or more additional operations including, in some cases, an operation 742 for receiving the one or more identities of the one or more transportation vehicle units, the one or more identified transportation vehicle units having been identified based, at least in part, on a determination that the one or more identified transportation vehicle units have one or more packages for delivery to one or more delivery locations that are along or proximate to a direct route that is the shortest distance route to the one or more destination locations from the one or more rendezvous locations. For instance, the transportation vehicle unit identity acquiring module 204* of the transport coordinating system 10* of FIG. 2A or 2B receiving (e.g., acquiring) the one or more identities of the one or more transportation vehicle units 20, the one or more identified transportation vehicle units 20 having been identified based, at least in part, on a determination (e.g., as determined by, for example, a passenger/package transport management system 16) that the one or more identified transportation vehicle units 20 have one or more packages for delivery to one or more delivery locations that are along or proximate to a direct route that is the shortest distance route to the one or more destination locations from the one or more rendezvous locations.

In the same or alternative implementations, operation 741 may alternatively or additionally include an operation 743 for receiving the one or more identities of the one or more transportation vehicle units, the one or more identified transportation vehicle units having been identified based, at least in part, on a determination that the one or more identified transportation vehicle units have one or more packages for delivery to one or more delivery locations that are along or proximate to a direct route that is the most time efficient route to the one or more destination locations from the one or more rendezvous locations. For instance, the transportation vehicle unit identity acquiring module 204* of the transport coordinating system 10* of FIG. 2A or 2B receiving (e.g., acquiring) the one or more identities of the one or more transportation vehicle units 20, the one or more identified transportation vehicle units 20 having been identified based, at least in part, on a determination (e.g., as determined by, for example, a passenger/package transport management system 16) that the one or more identified transportation vehicle units 20 have one or more packages for delivery to one or more delivery locations that are along or proximate to a direct route that is the most time efficient route to the one or more destination locations from the one or more rendezvous locations.

In the same or alternative implementations, operation 741 may alternatively or additionally include an operation 744 for receiving the one or more identities of the one or more transportation vehicle units, the one or more identified transportation vehicle units having been identified based, at least in part, on a determination that the one or more identified transportation vehicle units have one or more packages for delivery to one or more delivery locations that when delivered by the one or more identified transportation vehicle units during transport of the one or more end users do not add more than a predefined amount of time to the total amount of time it would have taken to transport the one or more end users to the one or more destination locations using the direct route and when no packages are being delivered during the transport of the one or more end users to the one or more destination locations. For instance, the transportation vehicle unit identity acquiring module 204* of the transport coordinating system 10* of FIG. 2A or 2B receiving (e.g., acquiring) the one or more identities of the one or more transportation vehicle units 20, the one or more identified transportation vehicle units 20 having been identified based, at least in part, on a determination (e.g., as determined by, for example, a passenger/package transport management system 16) that the one or more identified transportation vehicle units 20 have one or more packages for delivery to one or more delivery locations that when delivered by the one or more identified transportation vehicle units 20 during transport of the one or more end users 12 do not add more than a predefined amount of time to the total amount of time it would have taken to transport the one or more end users 12 to the one or more destination locations using the direct route and when no packages are being delivered by the one or more identified transportation vehicle units 20 during the transport of the one or more end users 12 to the one or more destination locations.

Figure 7G:
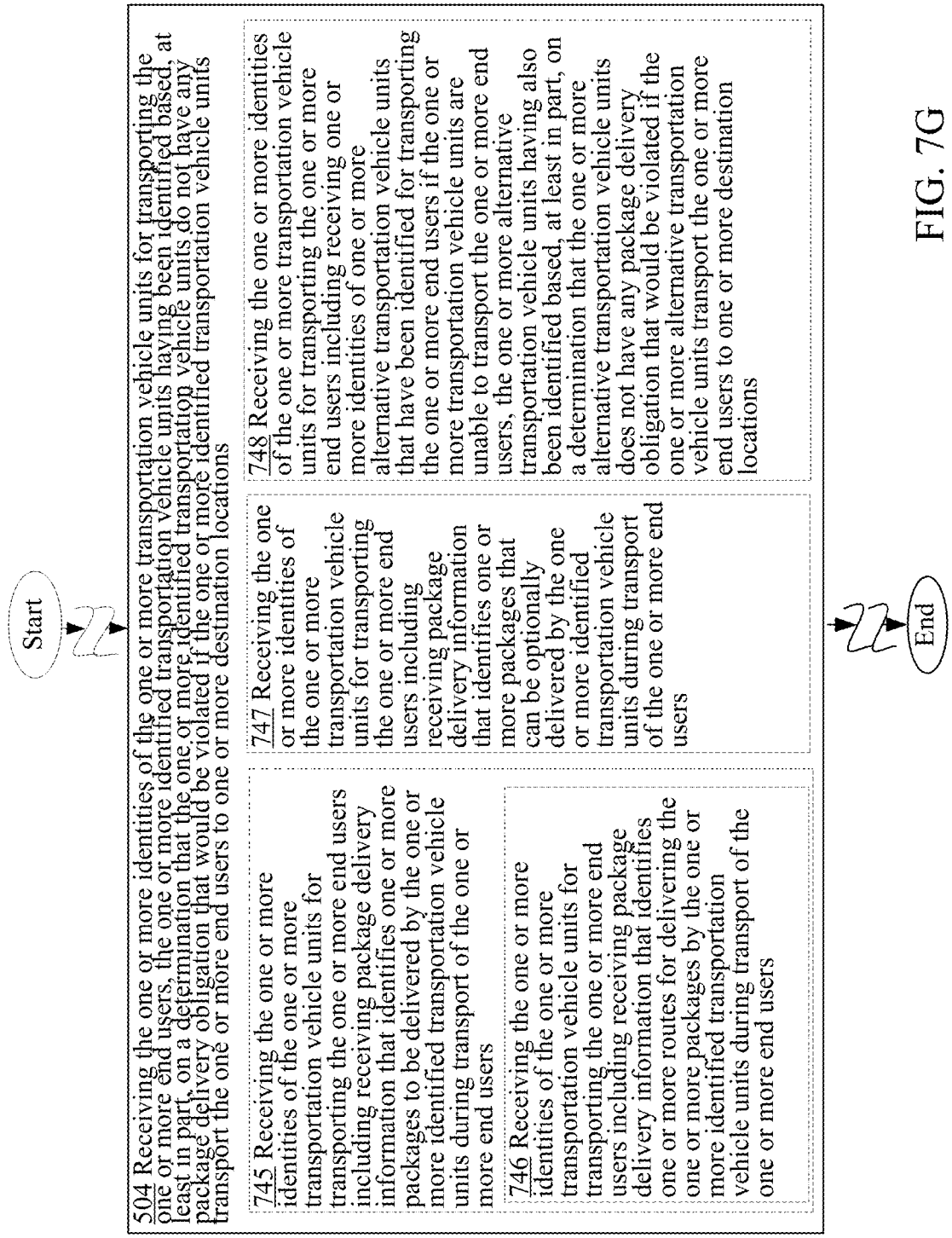
FIG. 7G is a high-level logic flowchart of a process depicting alternate implementations of the transportation vehicle unit identity receiving operation 504 of FIG. 5.

Turning now to FIG. 7G, in various implementations, the transportation vehicle unit identity receiving operation 504 may include an operation 745 for receiving the one or more identities of the one or more transportation vehicle units for transporting the one or more end users including receiving package delivery information that identifies one or more packages to be delivered by the one or more identified transportation vehicle units during transport of the one or more end users. For instance, the transportation vehicle unit identity acquiring module 204* including the package delivery information acquiring module 308 (see FIG. 3B) of the transport coordinating system 10* of FIG. 2A or 2B receiving or acquiring the one or more identities of the one or more transportation vehicle units 20 for transporting the one or more end users 12 including receiving, by the package delivery information acquiring module 308, package delivery information that identifies one or more packages to be delivered by the one or more identified transportation vehicle units 20 during transport of the one or more end users 12.

As further illustrated in FIG. 7G, in some implementations, operation 745 may further include an operation 746 for receiving the one or more identities of the one or more transportation vehicle units for transporting the one or more end users including receiving package delivery information that identifies one or more routes for delivering the one or more packages by the one or more identified transportation vehicle units during transport of the one or more end users. For instance, the transportation vehicle unit identity acquiring module 204* including the package delivery information acquiring module 308 of the transport coordinating system 10* of FIG. 2A or 2B receiving (e.g., acquiring) the one or more identities of the one or more transportation vehicle units 20 for transporting the one or more end users 12 including receiving, by the package delivery information acquiring module 308, package delivery information that identifies one or more routes for delivering the one or more packages by the one or more identified transportation vehicle units 20 during transport of the one or more end users 12.

In some implementations, the transportation vehicle unit identity receiving operation 504 may actually include an operation 747 for receiving the one or more identities of the one or more transportation vehicle units for transporting the one or more end users including receiving package delivery information that identifies one or more packages that can be optionally delivered by the one or more identified transportation vehicle units during transport of the one or more end users. For instance, the transportation vehicle unit identity acquiring module 204* including the package delivery information acquiring module 308 of the transport coordinating system 10* of FIG. 2A or 2B receiving (e.g., acquiring) the one or more identities of the one or more transportation vehicle units 20 for transporting the one or more end users 12 including receiving, by the package delivery information acquiring module 308, package delivery information that identifies one or more packages that can be optionally delivered (e.g., optionally delivered at the discretion of a driver or end users 12) by the one or more identified transportation vehicle units 20 during transport of the one or more end users 12.

In the same or alternative implementations, the transportation vehicle unit identity receiving operation 504 may include an operation 748 for receiving the one or more identities of the one or more transportation vehicle units for transporting the one or more end users including receiving one or more identities of one or more alternative transportation vehicle units that have been identified for transporting the one or more end users if the one or more transportation vehicle units are unable to transport the one or more end users, the one or more alternative transportation vehicle units having also been identified based, at least in part, on a determination that the one or more alternative transportation vehicle units does not have any package delivery obligation that would be violated if the one or more alternative transportation vehicle units transport the one or more end users to one or more destination locations. For instance, the transportation vehicle unit identity acquiring module 204* of the transport coordinating system 10* of FIG. 2A or 2B receiving or acquiring the one or more identities of the one or more transportation vehicle units 20 for transporting the one or more end users 12 including receiving one or more identities of one or more alternative transportation vehicle units 20 that have been identified (e.g., identified by, for example, a passenger/package transport management system 16) for transporting the one or more end users 12 if the one or more transportation vehicle units 20 (e.g., the originally identified transportation vehicle units 20) are unable to transport the one or more end users 12, the one or more alternative transportation vehicle units 20 having also been identified based, at least in part, on a determination (e.g., as determined by, for example, a passenger/package transport management system 16) that the one or more alternative transportation vehicle units 20 do not have any package delivery obligation that would be violated if the one or more alternative transportation vehicle units 20 transport the one or more end users 12 to one or more destination locations.

Figure 7H:
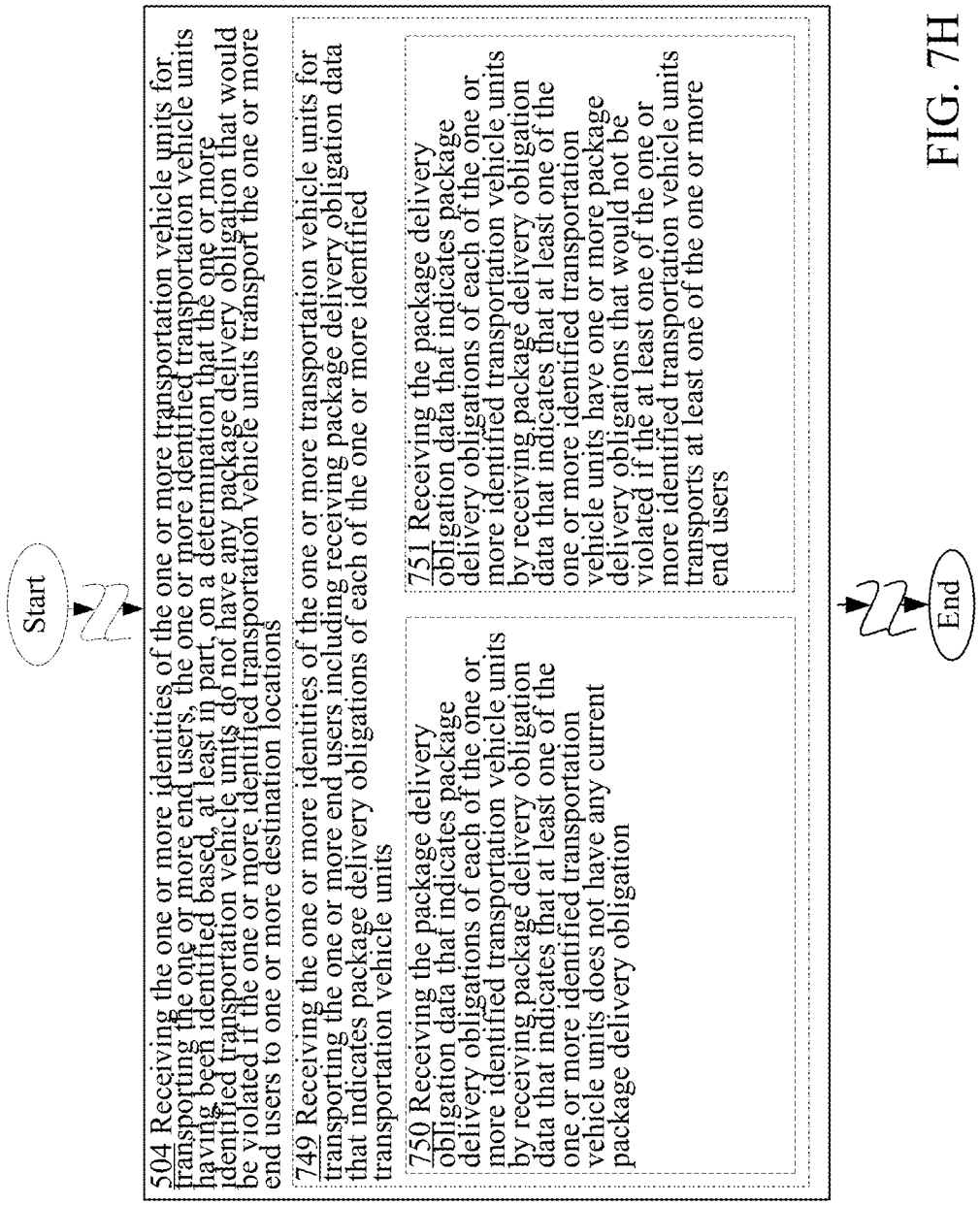
FIG. 7H is a high-level logic flowchart of a process depicting alternate implementations of the transportation vehicle unit identity receiving operation 504 of FIG. 5.

In the same or alternative implementations, the transportation vehicle unit identity receiving operation 504 may include an operation 749 for receiving the one or more identities of the one or more transportation vehicle units for transporting the one or more end users including receiving package delivery obligation data that indicates package delivery obligations of each of the one or more identified transportation vehicle units as illustrated in FIG. 7H. For instance, the transportation vehicle unit identity acquiring module 204* including the package delivery information acquiring module 308 of the transport coordinating system 10* of FIG. 2A or 2B receiving or acquiring the one or more identities of the one or more transportation vehicle units 20 for transporting the one or more end users 12 including receiving or acquiring, by the package delivery information acquiring module 308, package delivery obligation data that indicates package delivery obligations of each of the one or more identified transportation vehicle units 20.

In some implementations, operation 749 may further include an operation 750 for receiving the package delivery obligation data that indicates package delivery obligations of each of the one or more identified transportation vehicle units by receiving package delivery obligation data that indicates that at least one of the one or more identified transportation vehicle units does not have any current package delivery obligation. For instance, the package delivery information acquiring module 308 of the transport coordinating system 10* of FIG. 2A or 2B receiving the package delivery obligation data that indicates package delivery obligations of each of the one or more identified transportation vehicle units 20 by receiving or acquiring package delivery obligation data that indicates that at least one of the one or more identified transportation vehicle units 20 does not have any current package delivery obligation (e.g., does not have any package delivery obligation for delivering one or more package on the date that the one or more end users 12 are to transported).

In the same or different implementations, operation 749 may additionally or alternatively include an operation 751 for receiving the package delivery obligation data that indicates package delivery obligations of each of the one or more identified transportation vehicle units by receiving package delivery obligation data that indicates that at least one of the one or more identified transportation vehicle units have one or more package delivery obligations that would not be violated if the at least one of the one or more identified transportation vehicle units transports at least one of the one or more end users. For instance, the package delivery information acquiring module 308 of the transport coordinating system 10* of FIG. 2A or 2B receiving the package delivery obligation data that indicates package delivery obligations of each of the one or more identified transportation vehicle units 20 by receiving package delivery obligation data that indicates that at least one of the one or more identified transportation vehicle units 20 have one or more package delivery obligations (e.g., an obligation that does not require a package to be delivered during transport of the one or more end users 12) that would not be violated if the at least one of the one or more identified transportation vehicle units 20 transports at least one of the one or more end users 12.

Figure 8A:
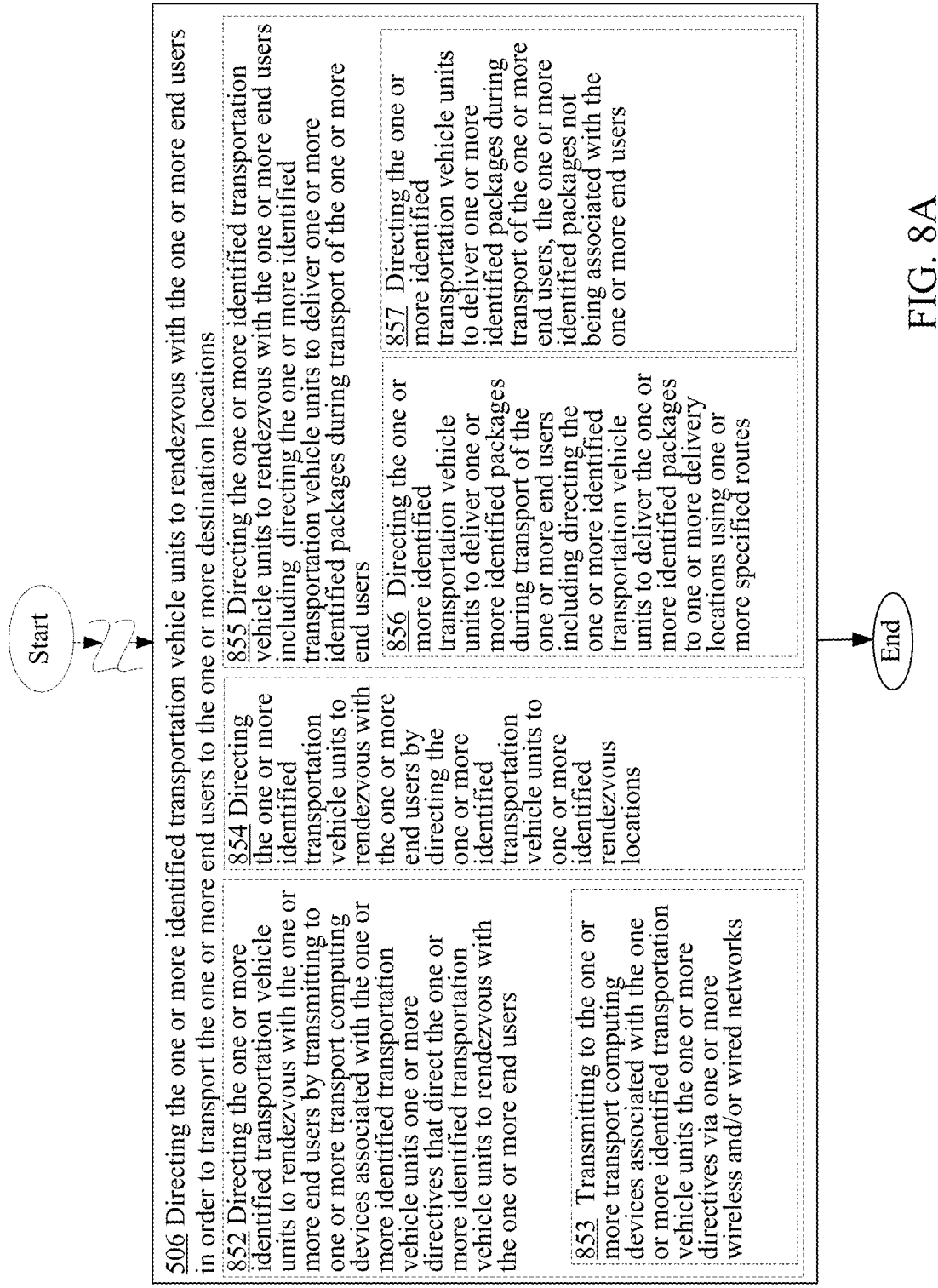
FIG. 8A is a high-level logic flowchart of a process depicting alternate implementations of the transportation vehicle unit directing operation 506 of FIG. 5.
Figure 8B:
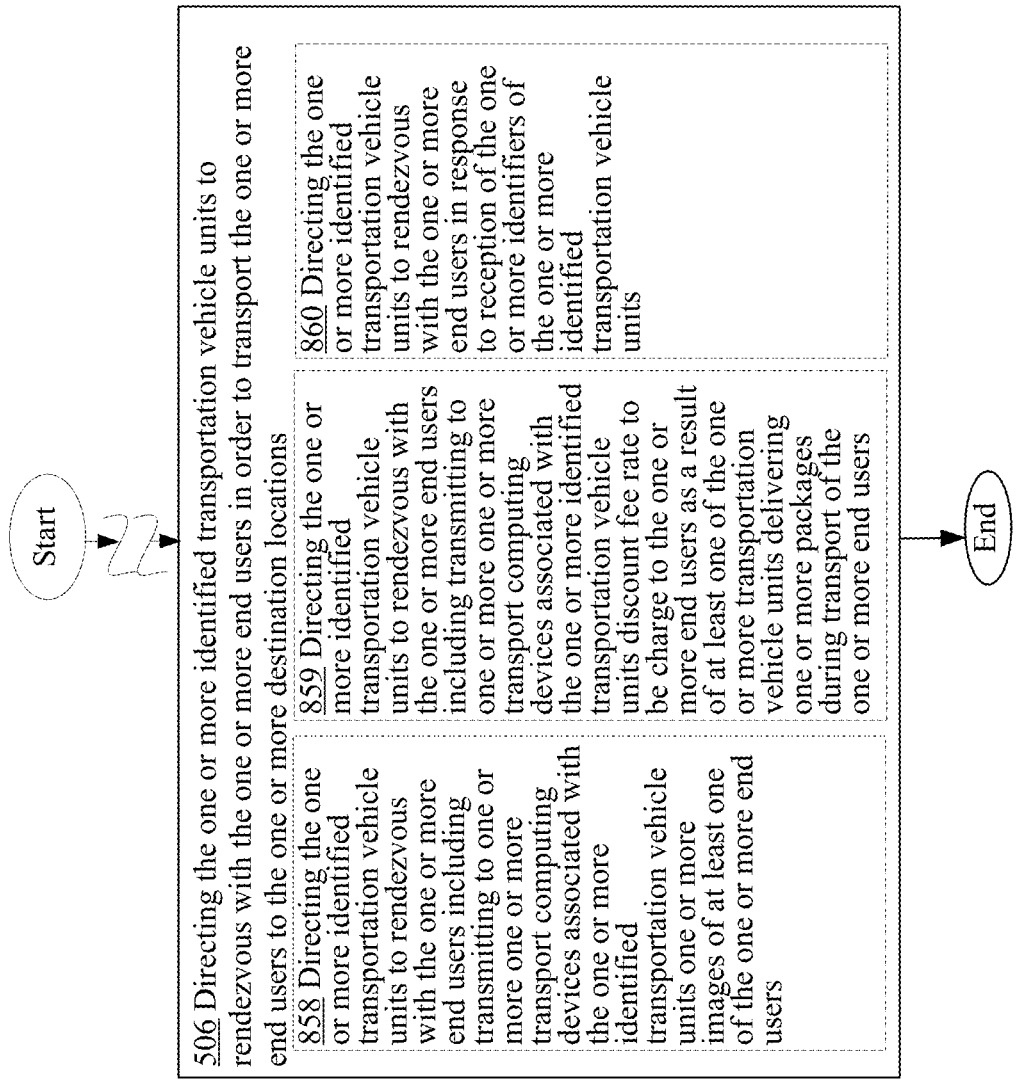
FIG. 8B is a high-level logic flowchart of a process depicting alternate implementations of the transportation vehicle unit directing operation 506 of FIG. 5.

Referring back to the transportation vehicle unit directing operation 506 of FIG. 5, the transportation vehicle unit directing operation 506 similar to the request transmitting operation 502 and the transportation vehicle unit identity receiving operation 504 of FIG. 5 may be executed in a number of different ways in various alternative embodiments as illustrated, for example, in FIGS. 8A and 8B. In some cases, for example, the transportation vehicle unit directing operation 506 may actually include an operation 852 for directing the one or more identified transportation vehicle units to rendezvous with the one or more end users by transmitting to one or more transport computing devices associated with the one or more identified transportation vehicle units one or more directives that direct the one or more identified transportation vehicle units to rendezvous with the one or more end users. For instance, the transportation vehicle unit directing module 206* including the directive transmitting module 310 (see FIG. 3C) of the transport coordinating system 10* of FIG. 2A or 2B directing the one or more identified transportation vehicle units 20 to rendezvous with the one or more end users 12 by having the directive transmitting module 310 transmit to one or more transport computing devices (e.g., a smartphone, a laptop computer, a tablet computer, a dedicated computing/communication device) associated with the one or more identified transportation vehicle units 20 (e.g., associated with one or more drivers or one or more transportation vehicles of the one or more transportation vehicle units 20) one or more directives (e.g., instructions) that direct the one or more identified transportation vehicle units 20 to rendezvous with the one or more end users 12.

In some cases, operation 852 may further include an operation 853 for transmitting to the one or more transport computing devices associated with the one or more identified transportation vehicle units the one or more directives via one or more wireless and/or wired networks. For instance, the directive transmitting module 310 of the transport coordinating system 10* of FIG. 2A or 2B transmitting to the one or more transport computing devices associated with the one or more identified transportation vehicle units 20 the one or more directives via one or more wireless and/or wired networks 18 (e.g., cellular data network, WLAN, WMAN, and so forth).

In the same or different implementations, the transportation vehicle unit directing operation 506 may additionally or alternatively include an operation 854 for directing the one or more identified transportation vehicle units to rendezvous with the one or more end users by directing the one or more identified transportation vehicle units to one or more identified rendezvous locations. For instance, the transportation vehicle unit directing module 206* of the transport coordinating system 10* of FIG. 2A or 2B directing the one or more identified transportation vehicle units 20 to rendezvous with the one or more end users 12 by directing or instructing the one or more identified transportation vehicle units 20 to one or more identified rendezvous locations. In some cases, the one or more identified transportation vehicle units 20 may be directed to the one or more identified rendezvous locations by simply providing to the one or more identified transportation vehicle units 20 (e.g., providing to one or more transport computing devices associated with the one or more identified transportation vehicle units 20) the location or locations of the one or more identified rendezvous locations. In some cases, the rendezvous location may be the current location of the one or more end users 12 (e.g., the location of the one or more end users 12 when the one or more end users 12 requests for a transportation vehicle unit 20).

In the same or different implementations, the transportation vehicle unit directing operation 506 may additionally or alternatively include an operation 855 for directing the one or more identified transportation vehicle units to rendezvous with the one or more end users including directing the one or more identified transportation vehicle units to deliver one or more identified packages during transport of the one or more end users. For instance, the transportation vehicle unit directing module 206* of the transport coordinating system 10* of FIG. 2A or 2B directing the one or more identified transportation vehicle units 20 to rendezvous with the one or more end users 12 including directing (e.g., instructing) the one or more identified transportation vehicle units 20 to deliver one or more identified packages during transport of the one or more end users 12. For example, the one or more identified transportation vehicle units 20 (via one or more transport computing devices associated with the one or more identified transportation vehicle units 20) may be instructed to deliver one or more packages (from a plurality of packages being carried by the one or more identified transportation vehicle units 20) during transport of the one or more end users 12 by the one or more identified transportation vehicle units 20.

As further illustrated, in some implementations, operation 855 may further include an operation 856 for directing the one or more identified transportation vehicle units to deliver one or more identified packages during transport of the one or more end users including directing the one or more identified transportation vehicle units to deliver the one or more identified packages to one or more delivery locations using one or more specified routes. For instance, the transportation vehicle unit directing module 206* of the transport coordinating system 10* of FIG. 2A or 2B directing the one or more identified transportation vehicle units 20 to deliver one or more identified packages during transport of the one or more end users 12 including directing (e.g., instructing) the one or more identified transportation vehicle units 20 to deliver the one or more identified packages to one or more delivery locations using one or more specified routes.

In the same or different implementations, operation 855 may additionally or alternatively include an operation 857 for directing the one or more identified transportation vehicle units to deliver one or more identified packages during transport of the one or more end users, the one or more identified packages not being associated with the one or more end users. For instance, the transportation vehicle unit directing module 206* of the transport coordinating system 10* of FIG. 2A or 2B directing the one or more identified transportation vehicle units 20 to deliver one or more identified packages during transport of the one or more end users 12, the one or more identified packages not being associated with the one or more end users 12 to be transported by the one or more identified transportation vehicle units 20.

Referring now to FIG. 8B, in some implementations, the transportation vehicle unit directing operation 506 may include an operation 858 for directing the one or more identified transportation vehicle units to rendezvous with the one or more end users including transmitting to one or more one or more transport computing devices associated with the one or more identified transportation vehicle units one or more images of at least one of the one or more end users. For instance, the transportation vehicle unit directing module 206* including the end user image transmitting module 312 (see FIG. 3C) of the transport coordinating system 10* of FIG. 2A or 2B directing the one or more identified transportation vehicle units 20 to rendezvous with the one or more end users 12 including transmitting, by the end user image transmitting module 312 and to one or more one or more transport computing devices associated with the one or more identified transportation vehicle units 20, one or more images (e.g., facial images) of at least one of the one or more end users 12.

In the same or alternative implementations, the transportation vehicle unit directing operation 506 may additionally or alternatively include an operation 859 for directing the one or more identified transportation vehicle units to rendezvous with the one or more end users including transmitting to one or more one or more transport computing devices associated with the one or more identified transportation vehicle units discount fee rate to be charge to the one or more end users as a result of at least one of the one or more transportation vehicle units delivering one or more packages during transport of the one or more end users. For instance, the transportation vehicle unit directing module 206* including the discount fee rate transmitting module 314 (see FIG. 3C) of the transport coordinating system 10* of FIG. 2A or 2B directing the one or more identified transportation vehicle units 20 to rendezvous with the one or more end users 12 including transmitting, by the discount fee rate transmitting module 314 and to one or more one or more transport computing devices associated with the one or more identified transportation vehicle units 20, discount fee rate to be charge to the one or more end users 12 as a result of at least one of the one or more transportation vehicle units 20 delivering one or more packages (e.g., parcels not associated with the one or more end users 12) during transport of the one or more end users 12.

In the same or alternative implementations, the transportation vehicle unit directing operation 506 may additionally or alternatively include an operation 860 for directing the one or more identified transportation vehicle units to rendezvous with the one or more end users in response to reception of the one or more identifiers of the one or more identified transportation vehicle units. For instance, the transportation vehicle unit directing module 206* including the discount fee rate transmitting module 314 (see FIG. 3C) of the transport coordinating system 10* of FIG. 2A or 2B directing the one or more identified transportation vehicle units 20 to rendezvous with the one or more end users 12 in response to reception of the one or more identifiers (e.g., driver identifiers, transport computing device identifiers, transportation vehicle identifiers, and so forth) of the one or more identified transportation vehicle units 20.

Figure 9:
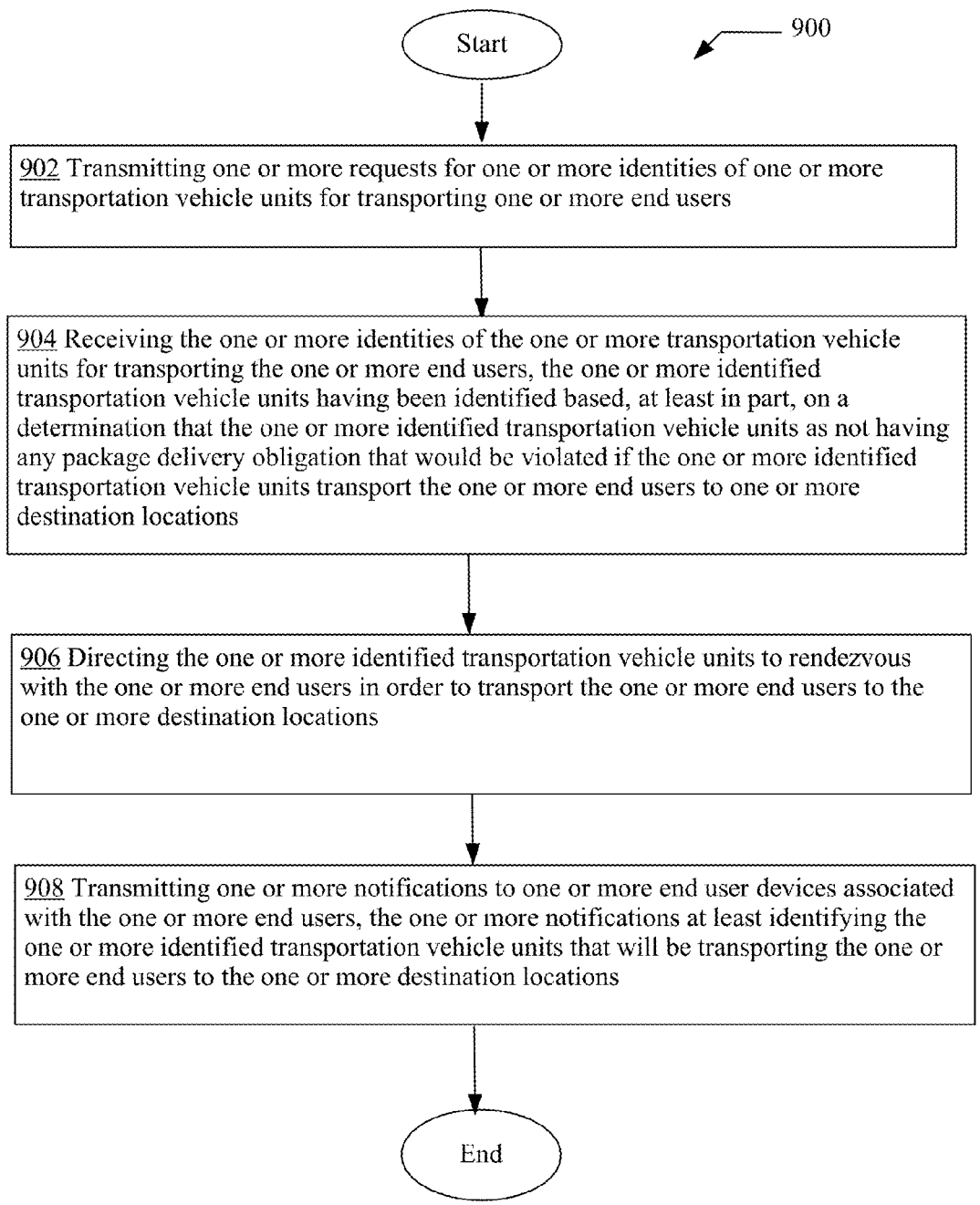
FIG. 9 is a high-level logic flowchart of another process, e.g., operational flow 900, according to some embodiments.

Turning now to FIG. 9 illustrating another operational flow 900. Operational flow 900 includes certain operations that mirror the operations included in operational flow 500 of FIG. 5. These operations include a request transmitting operation 902, a transportation vehicle unit identity receiving operation 904, and a transportation vehicle unit directing operation 906 that corresponds to and mirrors the request transmitting operation 502, the transportation vehicle unit identity receiving operation 504, and transportation vehicle unit directing operation 506, respectively, of FIG. 5.

In addition, operational flow 900 further includes a notification transmitting operation 908 for transmitting one or more notifications to one or more end user devices associated with the one or more end users, the one or more notifications at least identifying the one or more identified transportation vehicle units that will be transporting the one or more end users to the one or more destination locations. For instance, the notification transmitting module 208* of the transport coordinating system 10* of FIG. 2A or 2B transmitting (e.g., via one or more wireless and/or wired networks 18) one or more notifications to one or more end user devices 14 associated with the one or more end users 12, the one or more notifications at least identifying the one or more identified transportation vehicle units 20 that will be transporting (e.g., that are assigned to transport) the one or more end users 12 to the one or more destination locations.

Figure 10A:
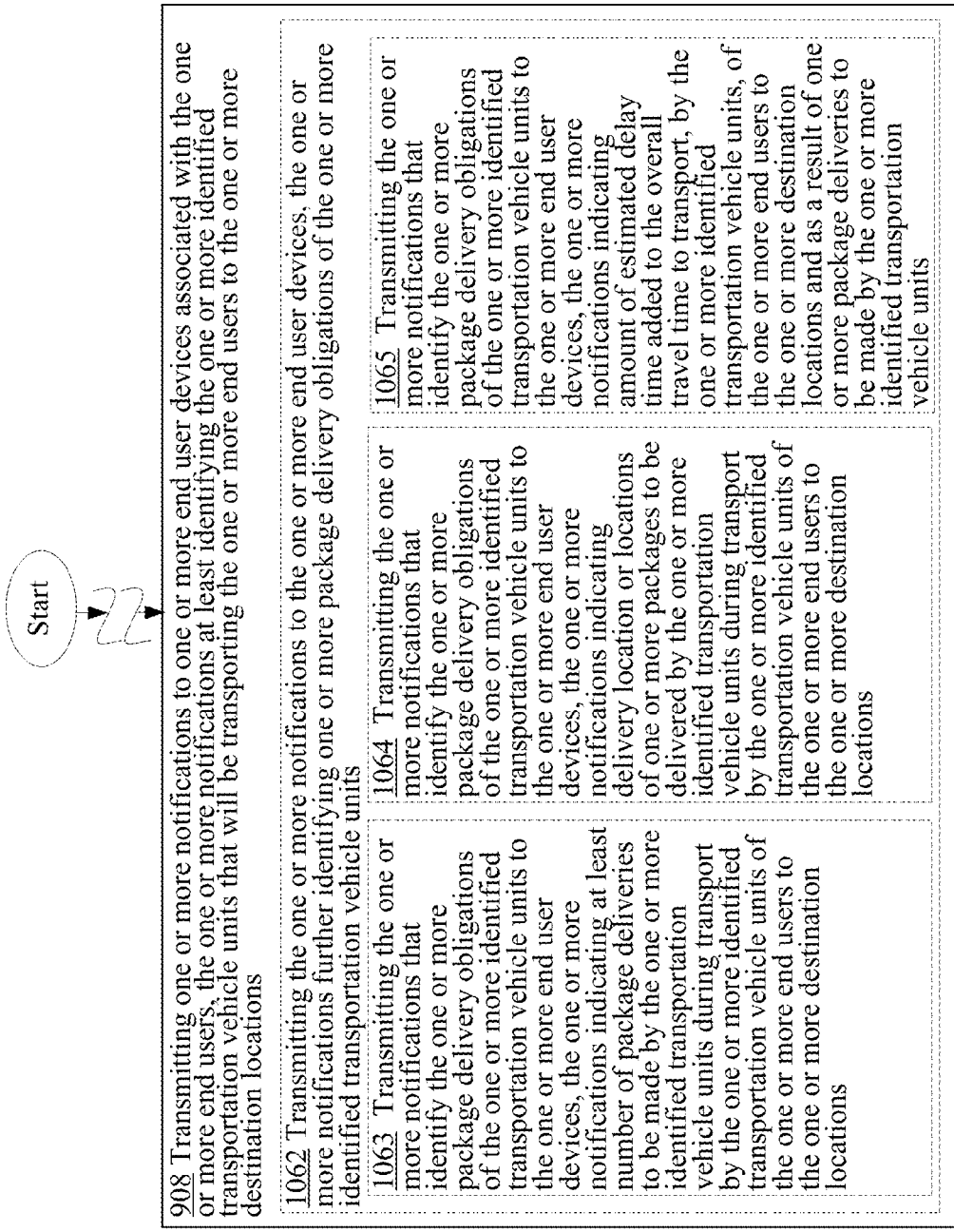
FIG. 10A is a high-level logic flowchart of a process depicting alternate implementations of the notification transmitting operation 908 of FIG. 9.
Figure 10B:
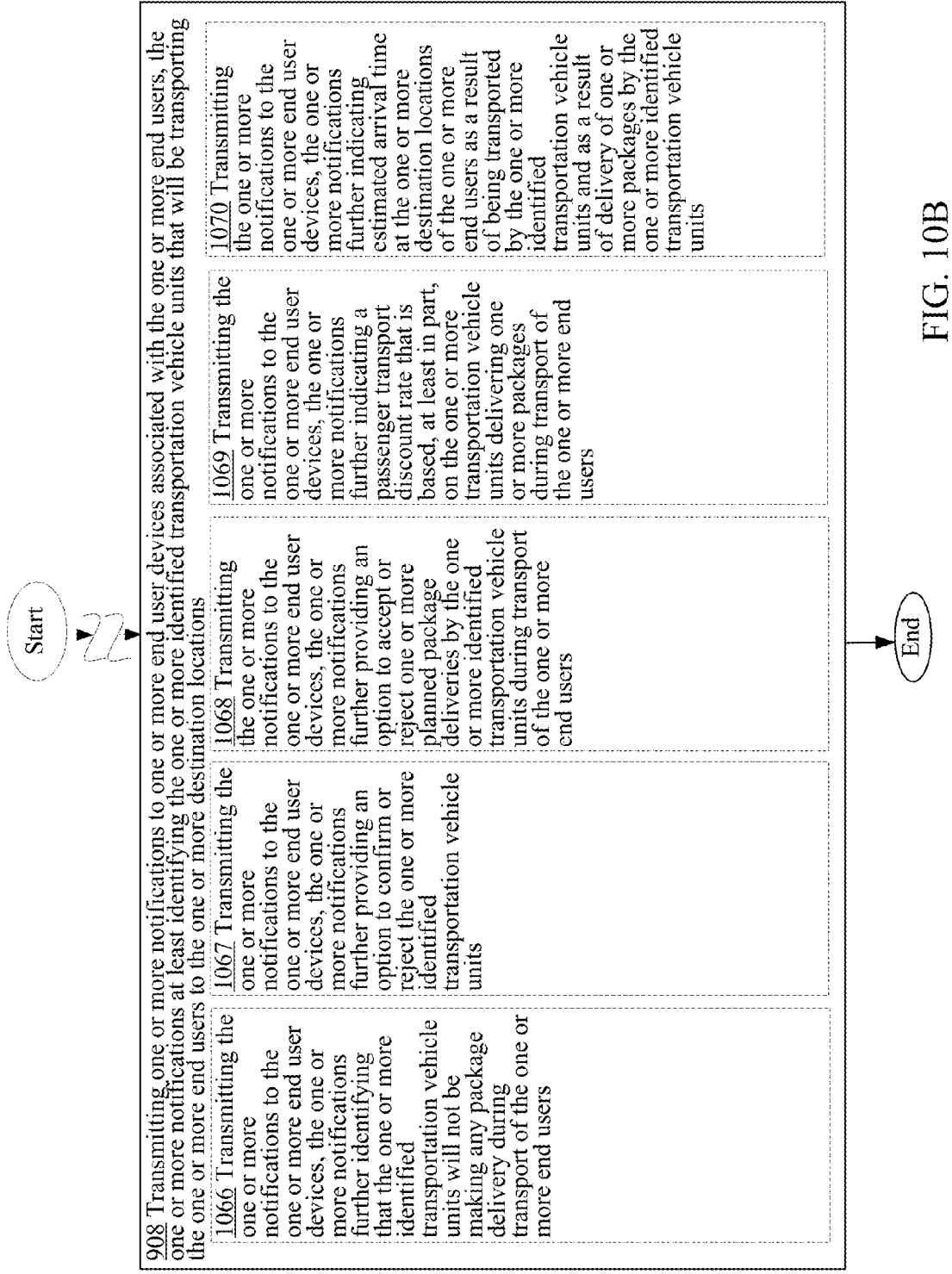
FIG. 10B is a high-level logic flowchart of a process depicting alternate implementations of the notification transmitting operation 908 of FIG. 9.

As further illustrated in FIGS. 10A and 10B, in various implementations, the notification transmitting operation 908 may include one or more additional operations including, in some cases, an operation 1062 for transmitting the one or more notifications to the one or more end user devices, the one or more notifications further identifying one or more package delivery obligations of the one or more identified transportation vehicle units. For instance, the notification transmitting module 208* of the transport coordinating system 10* of FIG. 2A or 2B transmitting the one or more notifications to the one or more end user devices 14, the one or more notifications further identifying one or more package delivery obligations of the one or more identified transportation vehicle units 20.

In various implementations, operation 1062 may include an operation 1063 for transmitting the one or more notifications that identify the one or more package delivery obligations of the one or more identified transportation vehicle units to the one or more end user devices, the one or more notifications indicating at least number of package deliveries to be made by the one or more identified transportation vehicle units during transport by the one or more identified transportation vehicle units of the one or more end users to the one or more destination locations. For instance, the notification transmitting module 208\* of the transport coordinating system 10\* of FIG. 2A or 2B transmitting the one or more notifications that identify the one or more package delivery obligations of the one or more identified transportation vehicle units 20 to the one or more end user devices 14, the one or more notifications indicating at least number of package deliveries (e.g., zero deliveries, one delivery, two deliveries, and so forth) to be made by the one or more identified transportation vehicle units 20 during transport by the one or more identified transportation vehicle units 20 of the one or more end users 12 to the one or more destination locations.

In the same or alternative implementations, operation 1062 may include an operation 1064 for transmitting the one or more notifications that identify the one or more package delivery obligations of the one or more identified transportation vehicle units to the one or more end user devices, the one or more notifications indicating delivery location or locations of one or more packages to be delivered by the one or more identified transportation vehicle units during transport by the one or more identified transportation vehicle units of the one or more end users to the one or more destination locations. For instance, the notification transmitting module 208\* of the transport coordinating system 10\* of FIG. 2A or 2B transmitting the one or more notifications that identify the one or more package delivery obligations of the one or more identified transportation vehicle units 20 to the one or more end user devices 14, the one or more notifications indicating delivery location or locations of one or more packages to be delivered by the one or more identified transportation vehicle units 20 during transport by the one or more identified transportation vehicle units 20 of the one or more end users 12 to the one or more destination locations.

In the same or alternative implementations, operation 1062 may include an operation 1065 for transmitting the one or more notifications that identify the one or more package delivery obligations of the one or more identified transportation vehicle units to the one or more end user devices, the one or more notifications indicating amount of estimated delay time added to the overall travel time to transport, by the one or more identified transportation vehicle units, of the one or more end users to the one or more destination locations and as a result of one or more package deliveries to be made by the one or more identified transportation vehicle units. For instance, the notification transmitting module 208\* of the transport coordinating system 10\* of FIG. 2A or 2B transmitting the one or more notifications that identify the one or more package delivery obligations of the one or more identified transportation vehicle units 20 to the one or more end user devices 14, the one or more notifications indicating amount of estimated delay time added to the overall travel time to transport, by the one or more identified transportation vehicle units 20, of the one or more end users 12 to the one or more destination locations and as a result of one or more package deliveries to be made by the one or more identified transportation vehicle units 20.

Turning now to FIG. 10B, in various implementations, the notification transmitting operation 908 may include an operation 1066 for transmitting the one or more notifications to the one or more end user devices, the one or more notifications further identifying that the one or more identified transportation vehicle units will not be making any package delivery during transport of the one or more end users. For instance, the notification transmitting module 208\* of the transport coordinating system 10\* of FIG. 2A or 2B transmitting the one or more notifications to the one or more end user devices 14, the one or more notifications further identifying or indicating that the one or more identified transportation vehicle units 20 will not be making any package delivery during transport of the one or more end users 12.

In the same or alternative implementations, the notification transmitting operation 908 may additionally or alternatively include an operation 1067 for transmitting the one or more notifications to the one or more end user devices, the one or more notifications further providing an option to confirm or reject the one or more identified transportation vehicle units. For instance, the notification transmitting module 208\* of the transport coordinating system 10\* of FIG. 2A or 2B transmitting the one or more notifications to the one or more end user devices 14, the one or more notifications further providing an option to confirm or reject the one or more identified transportation vehicle units 20 for transporting the one or more end users 12 to one or more destination locations.

In the same or alternative implementations, the notification transmitting operation 908 may additionally or alternatively include an operation 1068 for transmitting the one or more notifications to the one or more end user devices, the one or more notifications further providing an option to accept or reject one or more planned package deliveries by the one or more identified transportation vehicle units during transport of the one or more end users. For instance, the notification transmitting module 208\* of the transport coordinating system 10\* of FIG. 2A or 2B transmitting the one or more notifications to the one or more end user devices, the one or more notifications further providing an option to accept or reject one or more planned package deliveries by the one or more identified transportation vehicle units 20 during transport of the one or more end users 12. For example, if the one or more identified transportation vehicle units 20 are scheduled to make two package deliveries during transport of the one or more end users 12, then the one or more end users 12 may be given the option to reject the one or more identified transportation vehicle units 20 for transporting the one or more end users 12.

In the same or alternative implementations, the notification transmitting operation 908 may additionally or alternatively include an operation 1069 for transmitting the one or more notifications to the one or more end user devices, the one or more notifications further indicating a passenger transport discount rate that is based, at least in part, on the one or more transportation vehicle units delivering one or more packages during transport of the one or more end users. For instance, the notification transmitting module 208\* of the transport coordinating system 10\* of FIG. 2A or 2B transmitting the one or more notifications to the one or more end user devices 14, the one or more notifications further indicating a passenger transport discount rate that is based, at least in part, on the one or more transportation vehicle units 20 delivering one or more packages during transport of the one or more end users 12.

In the same or alternative implementations, the notification transmitting operation 908 may additionally or alternatively include an operation 1070 for transmitting the one or more notifications to the one or more end user devices, the one or more notifications further indicating estimated arrival time at the one or more destination locations of the one or more end users as a result of being transported by the one or more identified transportation vehicle units and as a result of delivery of one or more packages by the one or more identified transportation vehicle units. For instance, the notification transmitting module 208\* of the transport coordinating system 10\* of FIG. 2A or 2B transmitting the one or more notifications to the one or more end user devices 14, the one or more notifications further indicating estimated arrival time at the one or more destination locations of the one or more end users 12 as a result of being transported by the one or more identified transportation vehicle units 20 and as a result of delivery of one or more packages by the one or more identified transportation vehicle units 20.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Throughout this application, the terms "in an embodiment," "in one embodiment," "in some embodiments," "in several embodiments," "in at least one embodiment," "in various embodiments," and the like, may be used. Each of these terms, and all such similar terms should be construed as "in at least one embodiment, and possibly but not necessarily all embodiments," unless explicitly stated otherwise. Specifically, unless explicitly stated otherwise, the intent of phrases like these is to provide non-exclusive and non-limiting examples of implementations of the invention. The mere statement that one, some, or may embodiments include one or more things or have one or more features, does not imply that all embodiments include one or more things or have one or more features, but also does not imply that such embodiments must exist. It is a mere indicator of an example and should not be interpreted otherwise, unless explicitly stated as such.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A system for facilitating concurrent passenger transport and package delivery, comprising:
   circuitry for acquiring an identity of a transportation vehicle unit capable of concurrent passenger transport and package delivery, including at least acquiring an identity of a transportation vehicle unit capable of transport of an end user to one or more destination locations that is substantially compatible with one or more package delivery obligations; and
   circuitry for directing the transportation vehicle unit to rendezvous with the end user in order to transport the end user to the one or more destination locations.

2. The system of claim 1, wherein circuitry for acquiring an identity of a transportation vehicle unit capable of concurrent passenger transport and package delivery, including at least acquiring an identity of a transportation vehicle unit capable of transport of an end user to one or more destination locations that is substantially compatible with one or more package delivery obligations comprises:
   circuitry for acquiring the identity responsive to one or more requests for transporting the end user.

3. The system of claim 1, wherein circuitry for acquiring an identity of a transportation vehicle unit capable of concurrent passenger transport and package delivery, including at least acquiring an identity of a transportation vehicle unit capable of transport of an end user to one or more destination locations that is substantially compatible with one or more package delivery obligations comprises:
   circuitry for acquiring an identity of a transportation vehicle unit in proximate vicinity of one or more rendezvous locations for rendezvousing with the end user, including at least determining at least one position of the transportation vehicle unit based, at least in part, on data sensed by at least one hardware-based position sensor within a transport computing device of the transportation vehicle unit.

4. The system of claim 1, wherein circuitry for acquiring an identity of a transportation vehicle unit capable of concurrent passenger transport and package delivery, including at least acquiring an identity of a transportation vehicle unit capable of transport of an end user to one or more destination locations that is substantially compatible with one or more package delivery obligations comprises:
   circuitry for acquiring an identity of a transportation vehicle unit in compliance with one or more package delivery preferences of the end user.

5. The system of claim 1, wherein circuitry for acquiring an identity of a transportation vehicle unit capable of concurrent passenger transport and package delivery, including at least acquiring an identity of a transportation vehicle unit capable of transport of an end user to one or more destination locations that is substantially compatible with one or more package delivery obligations comprises:
   circuitry for acquiring an identity of a transportation vehicle unit that does not have any currently pending package delivery obligation that requires the transportation vehicle unit to deliver one or more packages during transport of the end user.

6. The system of claim 1, wherein circuitry for acquiring an identity of a transportation vehicle unit capable of concurrent passenger transport and package delivery, including at least acquiring an identity of a transportation vehicle unit capable of transport of an end user to one or more destination locations that is substantially compatible with one or more package delivery obligations comprises:
   circuitry for acquiring an identity of a transportation vehicle unit that does not have any currently pending package delivery time deadlines that would be violated if the end user is transported by the transportation vehicle unit.

7. The system of claim 1, wherein circuitry for acquiring an identity of a transportation vehicle unit capable of concurrent passenger transport and package delivery, including at least acquiring an identity of a transportation vehicle unit capable of transport of an end user to one or more destination locations that is substantially compatible with one or more package delivery obligations comprises:
   circuitry for acquiring an identity of a transportation vehicle unit that does not have any currently pending package delivery obligation for one or more specific destinations that would be violated if the end user is transported by the transportation vehicle unit.

8. The system of claim 1, wherein circuitry for acquiring an identity of a transportation vehicle unit capable of concurrent passenger transport and package delivery, including at least acquiring an identity of a transportation vehicle unit capable of transport of an end user to one or more destination locations that is substantially compatible with one or more package delivery obligations comprises:
   circuitry for acquiring an identity of a transportation vehicle unit that does not have any currently pending package delivery obligation related to delivering one or more packages while in one or more specified environmental conditions that would be violated if the end user is transported by the transportation vehicle unit.

9. The system of claim 1, wherein circuitry for acquiring an identity of a transportation vehicle unit capable of concurrent passenger transport and package delivery, including at least acquiring an identity of a transportation vehicle unit capable of transport of an end user to one or more destination locations that is substantially compatible with one or more package delivery obligations comprises:
   circuitry for acquiring an identity of a transportation vehicle unit based, at least in part, on a determination that the transportation vehicle unit at least partially satisfies one or more end user preferences of the end user.

10. The system of claim 1, wherein circuitry for acquiring an identity of a transportation vehicle unit capable of concurrent passenger transport and package delivery, including at least acquiring an identity of a transportation vehicle unit capable of transport of an end user to one or more destination locations that is substantially compatible with one or more package delivery obligations comprises:
    circuitry for acquiring an identity of a transportation vehicle unit having one or more package delivery obligations that will not violate one or more requirements for transporting the end user.

11. The system of claim 10, wherein circuitry for acquiring an identity of a transportation vehicle unit having one or more package delivery obligations that will not violate one or more requirements for transporting the end user comprises:
    circuitry for acquiring an identity of a transportation vehicle unit having one or more package delivery obligations that will not violate one or more spatial requirements for transporting the end user.

12. The system of claim 10, wherein circuitry for acquiring an identity of a transportation vehicle unit having one or more package delivery obligations that will not violate one or more requirements for transporting the end user comprises:

circuitry for acquiring an identity of a transportation vehicle unit having one or more package delivery obligations that will not violate one or more temporal requirements for transporting the end user.

13. The system of claim 10, wherein circuitry for acquiring an identity of a transportation vehicle unit having one or more package delivery obligations that will not violate one or more requirements for transporting the end user comprises:

circuitry for acquiring an identity of a transportation vehicle unit having one or more package delivery obligations that will not violate one or more requirements that no more than a predefined amount of package deliveries will occur during transport of the end user to the one or more destination locations.

14. The system of claim 10, wherein circuitry for acquiring an identity of a transportation vehicle unit having one or more package delivery obligations that will not violate one or more requirements for transporting the end user comprises:

circuitry for acquiring an identity of a transportation vehicle unit having one or more package delivery obligations to one or more delivery locations that are along or proximate to a route from a rendezvous location where the end user can rendezvous with the transportation vehicle unit for transport to the one or more destination locations.

15. The system of claim 14, wherein circuitry for acquiring an identity of a transportation vehicle unit having one or more package delivery obligations to one or more delivery locations that are along or proximate to a route from a rendezvous location where the end user can rendezvous with the transportation vehicle unit for transport to the one or more destination locations comprises:

circuitry for acquiring an identity of a transportation vehicle unit having one or more package delivery obligations to one or more delivery locations that are along or proximate to a route that is the shortest distance from the rendezvous location to the one or more destination locations.

16. The system of claim 14, wherein circuitry for acquiring an identity of a transportation vehicle unit having one or more package delivery obligations to one or more delivery locations that are along or proximate to a route from a rendezvous location where the end user can rendezvous with the transportation vehicle unit for transport to the one or more destination locations comprises:

circuitry for acquiring an identity of a transportation vehicle unit having one or more package delivery obligations to one or more delivery locations that are along or proximate to a direct route that is the most time efficient route from the rendezvous location to the one or more destination locations.

17. The system of claim 14, wherein circuitry for acquiring an identity of a transportation vehicle unit having one or more package delivery obligations to one or more delivery locations that are along or proximate to a route from a rendezvous location where the end user can rendezvous with the transportation vehicle unit for transport to the one or more destination locations comprises:

circuitry for acquiring an identity of a transportation vehicle unit having one or more package delivery obligations to one or more delivery locations that transport of do not add more than a predefined amount of time to the total amount of time it would have taken to transport the end user to the one or more destination locations.

18. The system of claim 1, wherein circuitry for acquiring an identity of a transportation vehicle unit capable of concurrent passenger transport and package delivery, including at least acquiring an identity of a transportation vehicle unit capable of transport of an end user to one or more destination locations that is substantially compatible with one or more package delivery obligations comprises:

circuitry for acquiring package delivery information that identifies one or more packages to be delivered by the transportation vehicle unit during transport of the end user.

19. The system of claim 18, wherein circuitry for acquiring package delivery information that identifies one or more packages to be delivered by the transportation vehicle unit during transport of the end user comprises:

circuitry for acquiring package delivery information that identifies one or more routes for delivering the one or more packages by the transportation vehicle unit during transport of the end user.

20. The system of claim 1, wherein circuitry for acquiring an identity of a transportation vehicle unit capable of concurrent passenger transport and package delivery, including at least acquiring an identity of a transportation vehicle unit capable of transport of an end user to one or more destination locations that is substantially compatible with one or more package delivery obligations comprises:

circuitry for acquiring package delivery information that identifies one or more packages that can be optionally delivered by the transportation vehicle unit during transport of the end user.

21. The system of claim 1, wherein circuitry for acquiring an identity of a transportation vehicle unit capable of concurrent passenger transport and package delivery, including at least acquiring an identity of a transportation vehicle unit capable of transport of an end user to one or more destination locations that is substantially compatible with one or more package delivery obligations comprises:

circuitry for acquiring, if the transportation vehicle unit is unable to transport end user, one or more identities of one or more alternative transportation vehicle units that do not have any package delivery obligation that would be violated if the one or more alternative transportation vehicle units transport the end user to the one or more destination locations.

22. The system of claim 1, wherein circuitry for acquiring an identity of a transportation vehicle unit capable of concurrent passenger transport and package delivery, including at least acquiring an identity of a transportation vehicle unit capable of transport of an end user to one or more destination locations that is substantially compatible with one or more package delivery obligations comprises:

circuitry for acquiring package delivery obligation data that indicates package delivery obligations of the transportation vehicle unit.

23. The system of claim 22, wherein circuitry for acquiring package delivery obligation data that indicates package delivery obligations of the transportation vehicle unit comprises:

circuitry for acquiring package delivery obligation data that indicates that the transportation vehicle unit does not have any current package delivery obligation.

24. The system of claim 22, wherein circuitry for acquiring package delivery obligation data that indicates package delivery obligations of the transportation vehicle unit comprises:
  circuitry for acquiring package delivery obligation data that indicates that the transportation vehicle unit has one or more package delivery obligations that would not be violated if the transportation vehicle unit transports the end user.

25. The system of claim 1, wherein circuitry for directing the transportation vehicle unit to rendezvous with the end user in order to transport the end user to the one or more destination locations comprises:
  circuitry for directing the transportation vehicle unit to deliver one or more identified packages during transport of the end user.

26. The system of claim 25, wherein circuitry for directing the transportation vehicle unit to deliver one or more identified packages during transport of the end user comprises:
  circuitry for directing the transportation vehicle unit to deliver the one or more identified packages to one or more delivery locations using one or more specified routes.

27. The system of claim 25, wherein circuitry for directing the transportation vehicle unit to deliver one or more identified packages during transport of the end user comprises:
  circuitry for directing the transportation vehicle unit to deliver one or more identified packages during transport of the end user, the one or more identified packages not being associated with end user.

28. The system of claim 1, wherein circuitry for directing the transportation vehicle unit to rendezvous with the end user in order to transport the end user to the one or more destination locations comprises:
  circuitry for transmitting, to one or more transport computing devices associated with the transportation vehicle unit, one or more images of the end user.

29. The system of claim 1, wherein circuitry for directing the transportation vehicle unit to rendezvous with the end user in order to transport the end user to the one or more destination locations comprises:
  circuitry for transmitting, to one or more transport computing devices associated with the transportation vehicle unit, a discount fee rate to be charged to the end user as a result of the transportation vehicle unit delivering one or more packages during transport of the end user.

30. The system of claim 1, further comprising:
  circuitry for transmitting, to an end user device associated with the end user, one or more notifications at least identifying the transportation vehicle unit that will be transporting the end user to the one or more destination locations.

31. The system of claim 30, wherein circuitry for transmitting, to an end user device associated with the end user, one or more notifications at least identifying the transportation vehicle unit that will be transporting the end user to the one or more destination locations comprises:
  circuitry for transmitting, to the end user device, one or more notifications further identifying one or more package delivery obligations of the transportation vehicle unit.

32. The system of claim 31, wherein circuitry for transmitting, to the end user device, one or more notifications identifying one or more package delivery obligations of the transportation vehicle unit comprises:
  circuitry for transmitting, to the end user device, one or more notifications indicating a number of package deliveries to be made by the transportation vehicle unit during transport by the transportation vehicle unit of the end user to the one or more destination locations.

33. The system of claim 31, wherein circuitry for transmitting, to the end user device, one or more notifications identifying one or more package delivery obligations of the transportation vehicle unit comprises:
  circuitry for transmitting, to the end user device, one or more notifications indicating an amount of estimated delay time added to the overall travel time to transport, by the transportation vehicle unit, of the end user to the one or more destination locations and as a result of one or more package deliveries to be made by the transportation vehicle unit.

34. The system of claim 30, wherein circuitry for transmitting, to an end user device associated with the end user, one or more notifications at least identifying the transportation vehicle unit that will be transporting the end user to the one or more destination locations comprises:
  circuitry for transmitting, to the end user device, one or more notifications providing an option to confirm or reject the transportation vehicle unit.

35. The system of claim 30, wherein circuitry for transmitting, to an end user device associated with the end user, one or more notifications at least identifying the transportation vehicle unit that will be transporting the end user to the one or more destination locations comprises:
  circuitry for transmitting, to the end user device, one or more notifications providing an option to accept or reject one or more planned package deliveries by the transportation vehicle unit during transport of the end user.

36. The system of claim 30, wherein circuitry for transmitting, to an end user device associated with the end user, one or more notifications at least identifying the transportation vehicle unit that will be transporting the end user to the one or more destination locations comprises:
  circuitry for transmitting, to the end user device, one or more notifications indicating a passenger transport discount rate that is based, at least in part, on the transportation vehicle unit delivering one or more packages during transport of the end user.

37. The system of claim 30, wherein circuitry for transmitting, to an end user device associated with the end user, one or more notifications at least identifying the transportation vehicle unit that will be transporting the end user to the one or more destination locations comprises:
  circuitry for transmitting, to the end user device, one or more notifications indicating an estimated arrival time of the end user at the one or more destination locations as a result of delivery of one or more packages by the transportation vehicle unit during transport of the end user.

38. The system of claim 1, wherein circuitry for acquiring an identity of a transportation vehicle unit capable of concurrent passenger transport and package delivery, including at least acquiring an identity of a transportation vehicle unit capable of transport of an end user to one or more destination locations that is substantially compatible with one or more package delivery obligations comprises:
  circuitry for acquiring an identity of a transportation vehicle unit capable of concurrent passenger transport and package delivery with no current package delivery obligation for transport of the end user to the one or more destination locations.

39. The system of claim 1, wherein circuitry for acquiring an identity of a transportation vehicle unit capable of concurrent passenger transport and package delivery, including at least acquiring an identity of a transportation vehicle unit capable of transport of an end user to one or more destination locations that is substantially compatible with one or more package delivery obligations comprises:
  circuitry for acquiring an identity of a transportation vehicle unit with a package delivery obligation subsequent to an estimated arrival of the end user at the one or more destination locations.

40. The system of claim 1, wherein circuitry for acquiring an identity of a transportation vehicle unit capable of concurrent passenger transport and package delivery, including at least acquiring an identity of a transportation vehicle unit capable of transport of an end user to one or more destination locations that is substantially compatible with one or more package delivery obligations comprises:
  circuitry for acquiring an identity of a transportation vehicle unit capable of concurrent passenger transport and food delivery, including at least acquiring an identity of a transportation vehicle unit capable of transport of an end user to one or more destination locations that is substantially compatible with one or more food delivery obligations.

41. The system of claim 1, wherein circuitry for acquiring an identity of a transportation vehicle unit capable of concurrent passenger transport and package delivery, including at least acquiring an identity of a transportation vehicle unit capable of transport of an end user to one or more destination locations that is substantially compatible with one or more package delivery obligations comprises:
  circuitry for acquiring an identity of a transportation vehicle unit capable of concurrent passenger transport and restaurant delivery, including at least acquiring an identity of a transportation vehicle unit capable of transport of an end user to one or more destination locations that is substantially compatible with one or more restaurant delivery obligations.

42. The system of claim 1, wherein circuitry for acquiring an identity of a transportation vehicle unit capable of concurrent passenger transport and package delivery, including at least acquiring an identity of a transportation vehicle unit capable of transport of an end user to one or more destination locations that is substantially compatible with one or more package delivery obligations comprises:
  circuitry for acquiring an identity of a transportation vehicle unit capable of transporting an end user from a rendezvous location to an end user destination location in association with delivering a package from a package pickup location to a package delivery location.

43. The system of claim 42, wherein circuitry for acquiring an identity of a transportation vehicle unit capable of transporting an end user from a rendezvous location to an end user destination location in association with delivering a package from a package pickup location to a package delivery location comprises:
  circuitry for acquiring an identity of a transportation vehicle unit capable of rendezvousing with an end user during carriage of a package to transport the end user to an end user destination location at least one of previous to, concurrent with, or subsequent to delivery of the package.

44. The system of claim 42, wherein circuitry for acquiring an identity of a transportation vehicle unit capable of transporting an end user from a rendezvous location to an end user destination location in association with delivering a package from a package pickup location to a package delivery location comprises:
  circuitry for acquiring an identity of a transportation vehicle unit capable of pickup of a package for delivery during carriage of an end user to deliver the package at least one of previous to, concurrent with, or subsequent to drop-off of the end user at the one or more destination locations.

45. The system of claim 42, wherein circuitry for acquiring an identity of a transportation vehicle unit capable of transporting an end user from a rendezvous location to an end user destination location in association with delivering a package from a package pickup location to a package delivery location comprises:
  circuitry for acquiring an identity of a transportation vehicle unit capable of simultaneous pickup of a package for delivery and rendezvous with an end user for transport to one or more destinations.

46. The system of claim 45, wherein circuitry for acquiring an identity of a transportation vehicle unit capable of simultaneous pickup of a package for delivery and rendezvous with an end user for transport to one or more destinations comprises:
  circuitry for acquiring an identity of a transportation vehicle unit capable of simultaneous delivery of the package and drop-off of the end user subsequent to the simultaneous pickup of the package for the delivery and rendezvous with the end user for the transport to the one or more destinations.

47. The system of claim 1, wherein circuitry for acquiring an identity of a transportation vehicle unit capable of concurrent passenger transport and package delivery, including at least acquiring an identity of a transportation vehicle unit capable of transport of an end user to one or more destination locations that is substantially compatible with one or more package delivery obligations comprises:
  circuitry for acquiring an identity of a transportation vehicle unit capable of concurrent passenger transport and package delivery, including at least acquiring an identity of a transportation vehicle unit that does not have any package delivery obligation that would be violated if the transportation vehicle unit transports an end user to one or more destination locations.

48. The system of claim 1, wherein circuitry for acquiring an identity of a transportation vehicle unit capable of concurrent passenger transport and package delivery, including at least acquiring an identity of a transportation vehicle unit capable of transport of an end user to one or more destination locations that is substantially compatible with one or more package delivery obligations comprises:
  circuitry for acquiring an identity of a transportation vehicle unit capable of concurrent passenger transport and package delivery, including at least acquiring an identity of a transportation vehicle unit capable of transport of an end user to one or more destination locations that is capable of meeting the one or more package delivery obligations by at least one of reducing or minimizing end user preferences related to concurrent package delivery that would be violated.

49. The system of claim 1, wherein circuitry for acquiring an identity of a transportation vehicle unit capable of concurrent passenger transport and package delivery, including at least acquiring an identity of a transportation vehicle unit capable of transport of an end user to one or more destination locations that is substantially compatible with one or more package delivery obligations comprises:

circuitry for acquiring an identity of a transportation vehicle unit capable of concurrent passenger transport and package delivery, including at least acquiring an identity of a transportation vehicle unit capable of transport of an end user to one or more destination locations that is capable of meeting the one or more package delivery obligations by at least one of reducing or minimizing end user delay related to concurrent package delivery that would result.

50. A method for facilitating concurrent passenger transport and package delivery, comprising:

acquiring an identity of a transportation vehicle unit capable of concurrent passenger transport and package delivery, including at least acquiring an identity of a transportation vehicle unit capable of transport of an end user to one or more destination locations that is substantially compatible with one or more package delivery obligations; and directing the transportation vehicle unit to rendezvous with the end user in order to transport the end user to the one or more destination locations, wherein at least one of the acquiring or directing is at least partially implemented using at least one processing device.

51. A system for facilitating concurrent passenger transport and package delivery, comprising:

one or more computing devices; and one or more instructions which, when executed on at least some of the one or more computing devices, cause at least some of the one or more computing devices to perform one or more operations including at least:

acquiring an identity of a transportation vehicle unit capable of concurrent passenger transport and package delivery, including at least acquiring an identity of a transportation vehicle unit capable of transport of an end user to one or more destination locations that is substantially compatible with one or more package delivery obligations; and directing the transportation vehicle unit to rendezvous with the end user in order to transport the end user to the one or more destination locations.

* * * * *

UNITED STATES PATENT AND TRADEMARK OFFICE
CERTIFICATE OF CORRECTION

PATENT NO. : 9,767,423 B2
APPLICATION NO. : 14/511706
DATED : September 19, 2017
INVENTOR(S) : Lord et al.

Page 1 of 1

It is certified that error appears in the above-identified patent and that said Letters Patent is hereby corrected as shown below:

In the Specification

In Column 1, Line 30 under the "Priority Applications" please add the following:
-- For purposes of the USPTO extra-statutory requirements, the present application claims benefit of priority of United States Provisional Patent Application No. 61/989,394 titled RIDESHARING SCENARIOS, naming Richard T. Lord and Robert W. Lord as inventors, filed May 6, 2014, which was filed within the twelve months preceding the filing date of the present application or is an application of which a currently co-pending application is entitled to the benefit of the filing date. --

In the Claims

In Column 55, Line 61, Claim 31 "further identifying one or more" should be -- identifying one or more --

Signed and Sealed this
Ninth Day of January, 2018

Joseph Matal
*Performing the Functions and Duties of the*
*Under Secretary of Commerce for Intellectual Property and*
*Director of the United States Patent and Trademark Office*